US010715301B2

(12) United States Patent
Zhang et al.

(10) Patent No.: US 10,715,301 B2
(45) Date of Patent: Jul. 14, 2020

(54) RADIO-SPECTRUM SHARING (NR-SS) IN FREQUENCY-DIVISION DUPLEXING (FDD) SPECTRUM

(71) Applicant: QUALCOMM Incorporated, San Diego, CA (US)

(72) Inventors: Xiaoxia Zhang, San Diego, CA (US); Taesang Yoo, Riverside, CA (US); Siddhartha Mallik, San Diego, CA (US); Juan Montojo, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/637,497

(22) Filed: Jun. 29, 2017

(65) Prior Publication Data

US 2018/0131499 A1    May 10, 2018

Related U.S. Application Data

(60) Provisional application No. 62/418,598, filed on Nov. 7, 2016.

(51) Int. Cl.
*H04L 5/12* (2006.01)
*H04W 16/14* (2009.01)
(Continued)

(52) U.S. Cl.
CPC .............. *H04L 5/12* (2013.01); *H04L 5/0053* (2013.01); *H04L 5/14* (2013.01); *H04W 16/14* (2013.01);
(Continued)

(58) Field of Classification Search
CPC .... H04L 5/12; H04L 5/0005; H04W 74/0808; H04W 16/14; H04W 72/0446;
(Continued)

(56) References Cited

U.S. PATENT DOCUMENTS 9,419,776 B2    8/2016 Gauvreau et al.
9,445,283 B2    9/2016 Ma et al.
(Continued)

FOREIGN PATENT DOCUMENTS

WO    2016072763 A1    5/2016
WO    WO-2016072763 A1    5/2016

OTHER PUBLICATIONS

Qualcomm Incorporated: "Solutions for required functionalities and design targets", 3GPP Draft; R1-144000 Solutions for Required Functionalities and Design Targets, 3rd Generation Partnership Project (3GPP), Mobile Competence Centre ; 650, Route Des Lucioles ; F-06921 Sophia-Antipoli vol. RAN WG1, No. Ljubljana, Slovenia; Oct. 6, 2014-Oct. 10, 2014 Sep. 27, 2014 (Sep. 27, 2014), XP050869665, 5 pages Retrieved from the Internet: URL:http://www.3gpp.org/ftp/tsg_ran/WG1_RL1/TSGR178b/Docs/ [retrieved on Sep. 27, 2014].

(Continued)

*Primary Examiner* — Robert C Scheibel
*Assistant Examiner* — Mohammed S Chowdhury
(74) *Attorney, Agent, or Firm* — Haynes and Boone, LLP

(57) ABSTRACT

Wireless communications systems and methods related to sharing a frequency-division duplexing (FDD) spectrum among multiple network operating entities. In one embodiment, a first wireless communication device communicates, with a second wireless communication device in a downlink (DL) frequency band, a reservation signal in a first channel sensing time slot of a frame to reserve a transmission time slot in the frame. The first wireless communication device (Continued)

communicates, in an uplink (UL) frequency band, an UL control signal in the first channel sensing time slot. The UL frequency band and the DL frequency band are shared by a plurality of network operating entities for frequency-division duplexing (FDD) communications. In another embodiment, a first wireless communication device communicates, in a first frequency band of a FDD network shared by a plurality of network operating entities, a reservation signal to reserve the first frequency band for time-division duplexing (TDD) communications.

30 Claims, 13 Drawing Sheets

(51) Int. Cl.
   H04W 74/08     (2009.01)
   H04L 5/14      (2006.01)
   H04L 5/00      (2006.01)
   H04W 72/04     (2009.01)
   H04W 74/00     (2009.01)
(52) U.S. Cl.
   CPC ... *H04W 72/0446* (2013.01); *H04W 74/0808* (2013.01); *H04L 5/0005* (2013.01); *H04L 5/0091* (2013.01); *H04W 72/042* (2013.01); *H04W 72/0413* (2013.01); *H04W 74/002* (2013.01); *H04W 74/08* (2013.01)
(58) Field of Classification Search
   CPC ........... H04W 72/0413; H04W 74/002; H04W 72/042; H04W 74/08
   USPC ...................................................... 370/302
   See application file for complete search history.

(56) References Cited

U.S. PATENT DOCUMENTS

| | | |
|---|---|---|
| 2014/0204854 A1* | 7/2014 | Freda .................. H04L 1/18 370/329 |
| 2015/0078215 A1 | 3/2015 | Zhou et al. |
| 2015/0092703 A1* | 4/2015 | Xu ..................... H04L 5/003 370/329 |
| 2015/0312793 A1* | 10/2015 | Jeon ................ H04W 28/0205 370/329 |
| 2016/0066195 A1* | 3/2016 | Moon ................ H04W 16/14 455/454 |
| 2016/0073344 A1* | 3/2016 | Vutukuri ........... H04W 52/0216 370/252 |
| 2016/0105897 A1* | 4/2016 | Liu .................... H04W 72/1226 370/235 |
| 2016/0212625 A1 | 7/2016 | Damnjanovic et al. |
| 2016/0227578 A1* | 8/2016 | Lee ..................... H04W 74/004 |
| 2016/0234835 A1 | 8/2016 | Yerramalli et al. |
| 2016/0309469 A1 | 10/2016 | Shu et al. |
| 2017/0019909 A1* | 1/2017 | Si ...................... H04L 47/27 |
| 2017/0048861 A1* | 2/2017 | Choi ................... H04L 1/1887 |
| 2017/0208627 A1* | 7/2017 | You .................... H04W 72/0446 |
| 2018/0020359 A1* | 1/2018 | Belghoul ............ H04L 5/0062 |
| 2018/0124749 A1* | 5/2018 | Park .................... H04W 16/14 |

OTHER PUBLICATIONS

International Search Report and Written Opinion—PCT/US2017/055802—ISA/EPO—dated Jan. 18, 2018.
Qualcomm Incorporated: "Solutions for Required Functionalities and Design Targets", 3GPP Draft; 3GPP TSG-RAN WG1#78bis, R1-144000, Solutions for Required Functionalities and Design Targets, 3rd Generation Partnership Project (3GPP), Mobile Competence Centre; 650, Route Des Lucioles; F-06921 Sophia-Antipolis, vol. RAN WG1, No. Ljubljana, Slovenia; Oct. 6, 2014-Oct. 10, 2014, Sep. 27, 2014 (Sep. 27, 2014), XP050869665, 5 Pages, Retrieved from the Internet: URL: http://www.3gpp.org/ftp/tsg_ran/WG1_RL1/TSGR1_78b/Docs/R1-144000.zip.

* cited by examiner

RADIO-SPECTRUM SHARING (NR-SS) IN FREQUENCY-DIVISION DUPLEXING (FDD) SPECTRUM

CROSS REFERENCE TO RELATED APPLICATIONS

The present application claims priority to and the benefit of the U.S. Provisional Patent Application No. 62/418,598, filed Nov. 7, 2016, which is hereby incorporated by reference in its entirety.

TECHNICAL FIELD

This application relates to wireless communication systems, and more particularly to sharing a frequency-division duplexing (FDD) spectrum among multiple network operating entities.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations (BSs), each simultaneously supporting communication for multiple communication devices, which may be otherwise known as user equipment (UE).

A wireless communications system may operate over a shared spectrum, meaning that the wireless communications system includes one or more frequency bands that may be shared by multiple network operating entities. The shared spectrum may include unlicensed spectrum and/or licensed spectrum. In some instances, multiple network operating entities may share their licensed spectrum with each other to better utilize the spectrum. In some other instances, multiple network operating entities may obtain a licensed spectrum together.

Use of the available band spectrum may then be subject to a contention procedure that may involve the use of a medium-sensing procedure. For example, to avoid interference between different devices or between devices operated by different network operating entities, the wireless communications system may employ medium-sensing procedures, such as listen-before-talk (LBT), to ensure a particular channel is clear before transmitting a message. Medium-sensing procedures may utilize substantial signaling overhead and may result in increased latency, thus adversely affecting the use of shared spectrum by multiple network operating entities. Some studies or deployments focus on developing coordinated spectrum-sharing (SS) schemes for sharing a time-division duplexing (TDD) spectrum. However, some network operating entities operate over a frequency-division duplexing (FDD) spectrum. Accordingly, efficient coordinated SS schemes for sharing a FDD spectrum may be desirable.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication, includes communicating, by a first wireless communication device with a second wireless communication device in a downlink (DL) frequency band, a reservation signal in a first channel sensing time slot of a frame to reserve a transmission time slot in the frame; and communicating, by the first wireless communication device in an uplink (UL) frequency band, an UL control signal in the first channel sensing time slot, wherein the UL frequency band and the DL frequency band are shared by a plurality of network operating entities for frequency-division duplexing (FDD) communications.

In an additional aspect of the disclosure, a method of wireless communication, includes communicating, by a first wireless communication device in a first frequency band of a frequency-division duplexing (FDD) network shared by a plurality of network operating entities, a reservation signal in a first channel sensing time slot of a frame to reserve the first frequency band in a transmission time slot in the frame; communicating, by the first wireless communication device with a second wireless communication device in the first frequency band, downlink (DL) data in a DL portion of the transmission time slot; and communicating, by the first wireless communication device with the second wireless communication device in the first frequency band, uplink (UL) data in a UL portion of the transmission time slot In an additional aspect of the disclosure, an apparatus includes a transceiver configured to communicate, with a second wireless communication device in a downlink (DL) frequency band, a reservation signal in a first channel sensing time slot of a frame to reserve a transmission time slot in the frame; and communicate, in an uplink (UL) frequency band, an UL control signal in the first channel sensing time slot, wherein the UL frequency band and the DL frequency band are shared by a plurality of network operating entities for frequency-division duplexing (FDD) communications.

In an additional aspect of the disclosure, an apparatus includes a transceiver configured to communicate, in a first frequency band of a frequency-division duplexing (FDD) network shared by a plurality of network operating entities, a reservation signal in a first channel sensing time slot of a frame to reserve the first frequency band in a transmission time slot in the frame; communicate, with a second wireless communication device in the first frequency band, downlink (DL) data in a DL portion of the transmission time slot; and communicate, with the second wireless communication device in the first frequency band, uplink (UL) data in a UL portion of the transmission time slot.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
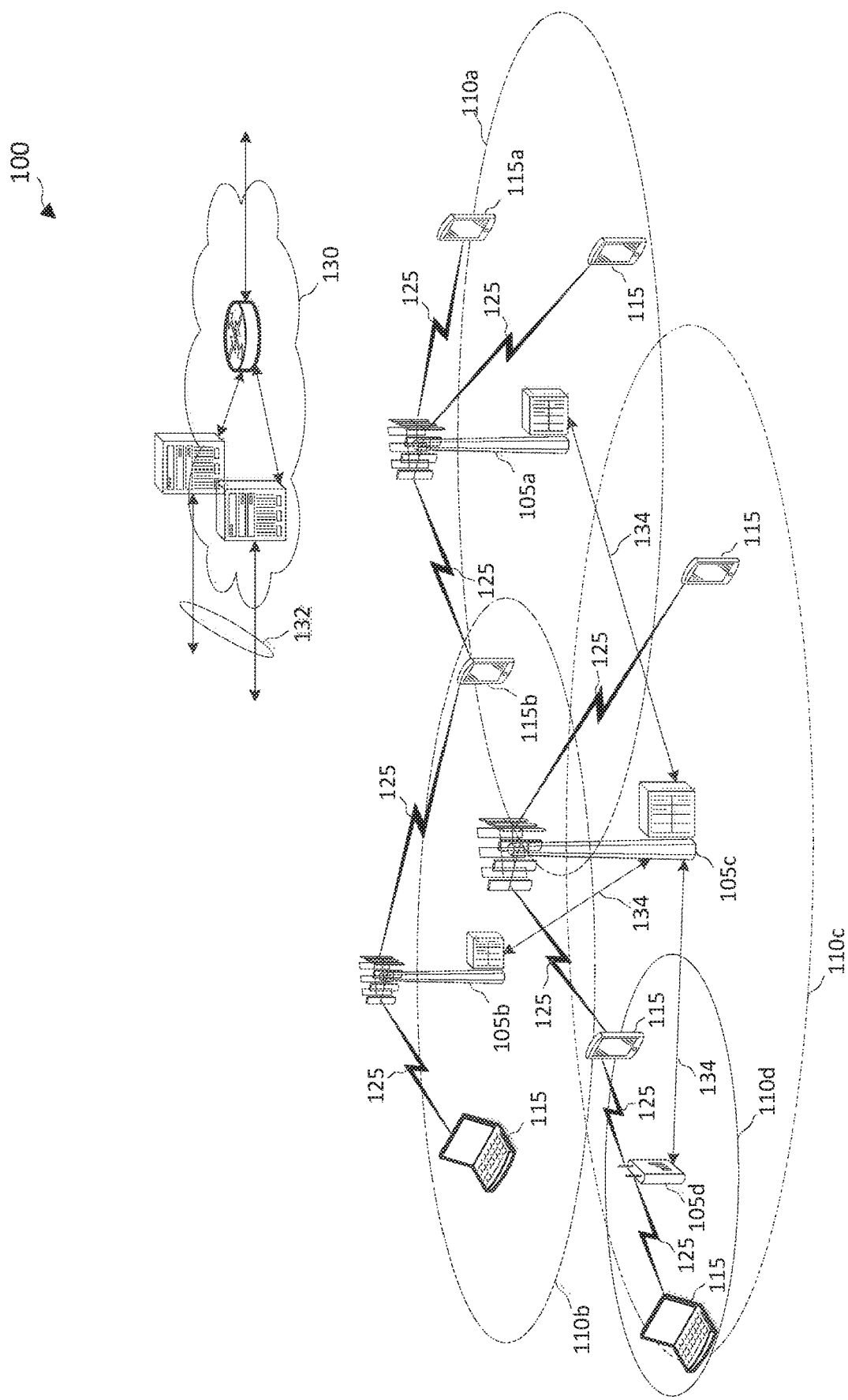
FIG. 1 illustrates a wireless communication network according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G) operating in mmWav bands) network.

The present disclosure describes coordinated SS mechanisms for sharing a FDD spectrum among multiple network operating entities. The disclosed embodiments partition a shared FDD spectrum including a DL frequency band and a UL frequency band into multiple transmit opportunity (TXOP) frames. Each TXOP frame includes a number of channel sensing time slots and a transmission time slot. Each channel sensing time slot is designated to a particular network operating entity. A BS of a network operating entity may reserve a transmission time slot in a frame for communications with corresponding UEs by sending a reservation signal in the channel sensing time slot assigned to the network operating entity. In one embodiment, the network operating entities operate in a FDD mode over the shared FDD spectrum, limiting DL transmissions in the DL frequency band and UL transmissions in the UL frequency band. For example, each TXOP frame includes both the UL frequency band and the DL frequency band. The FDD operation mode allows a BS to transmit a reservation signal while receiving a UL signal (e.g., carrying timing-critical data) from corresponding UEs, and thus may improve transmission latency for timing-critical data. In another embodiment, the network operating entities operate in a TDD mode over the shared FDD spectrum, using each of the UL frequency band and the DL frequency band as a separate shared TDD spectrum. For example, each TXOP frame includes the DL frequency band or the UL frequency band. Thus, each of the DL frequency band and the UL frequency band may carry both DL and UL transmissions. In some embodiments, to enable sharing of a FDD spectrum in a TDD mode, each channel sensing time slot may be assigned to a network operating entity associated with a particular power class so that high power class devices may not interfere with low power class devices. The disclosed embodiments are suitable for use in coverage areas including macro cells and small cells. The disclosed embodiments are compatible with any wireless communication protocol.

FIG. 1 illustrates a wireless communication network 100 according to embodiments of the present disclosure. The network 100 includes BSs 105, UEs 115, and a core network 130. In some embodiments, the network 100 operates over a shared spectrum. The shared spectrum may be unlicensed or partially licensed to one or more network operators. Access to the spectrum may be limited and may be controlled by a separate coordination entity. In some embodiments, the network 100 may be a LTE or LTE-A network. In yet other embodiments, the network 100 may be a millimeter wave (mmW) network, a new radio (NR) network, a 5G network, or any other successor network to LTE. The network 100 may be operated by more than one network operator. Wireless resources may be partitioned and arbitrated among the different network operators for coordinated communication between the network operators over the network 100.

The BSs 105 may wirelessly communicate with the UEs 115 via one or more BS antennas. Each BS 105 may provide communication coverage for a respective geographic coverage area 110. In 3GPP, the term "cell" can refer to this particular geographic coverage area of a BS and/or a BS subsystem serving the coverage area, depending on the context in which the term is used. In this regard, a BS 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a pico cell may be referred to as a pico BS. A BS for a femto cell may be referred to as a femto BS or a home BS. In the example shown in FIG. 1, the BSs 105a, 105b and 105c are examples of macro BSs for the coverage areas 110a, 110b and 110c, respectively. The BSs 105d is an example of a pico BS or a femto BS for the coverage area 110d. As will be recognized, a BS 105 may support one or multiple (e.g., two, three, four, and the like) cells.

Communication links 125 shown in the network 100 may include uplink (UL) transmissions from a UE 115 to a BS 105, or downlink (DL) transmissions, from a BS 105 to a UE 115. The UEs 115 may be dispersed throughout the network 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

The BSs 105 may communicate with the core network 130 and with one another. The core network 130 may provide user authentication, access authorization, tracking, Internet Protocol (IP) connectivity, and other access, routing, or mobility functions. At least some of the BSs 105 (e.g., which may be an example of an evolved NodeB (eNB) or an access node controller (ANC)) may interface with the core network 130 through backhaul links 132 (e.g., S1, S2, etc.) and may perform radio configuration and scheduling for communication with the UEs 115. In various examples, the BSs 105 may communicate, either directly or indirectly (e.g., through core network 130), with each other over backhaul links 134 (e.g., X1, X2, etc.), which may be wired or wireless communication links.

Each BS 105 may also communicate with a number of UEs 115 through a number of other BSs 105, where the BS 105 may be an example of a smart radio head. In alternative configurations, various functions of each BS 105 may be distributed across various BSs 105 (e.g., radio heads and access network controllers) or consolidated into a single BS 105.

In some implementations, the network 100 utilizes orthogonal frequency division multiplexing (OFDM) on the downlink and single-carrier frequency division multiplexing (SC-FDM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. The system bandwidth may also be partitioned into sub-bands.

In an embodiment, the BSs 105 can assign or schedule transmission resources (e.g., in the form of time-frequency resource blocks) for DL and UL transmissions in the network 100. The communication can be in the form of radio frames. A radio frame may be divided into a plurality of subframes. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are pre-determined signals that facilitate the communications between the BSs 105 and the UEs 115. For example, a reference signal can have a particular pilot pattern or structure, where pilot tones may span across an operational bandwidth or frequency band, each positioned at a pre-defined time and a pre-defined frequency. Control information may include resource assignments and protocol controls. Data may include protocol data and/or operational data.

In an embodiment, a UE 115 attempting to access the network 100 may perform an initial cell search by detecting a primary synchronization signal (PSS) from a BS 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as time division duplexing (TDD) systems, may transmit an SSS but not a PSS. Both the PSS and the SSS may be located in a central portion of a carrier, respectively. After receiving the PSS and SSS, the UE 115 may receive a master information block (MIB), which may be transmitted in the physical broadcast channel (PBCH). The MIB may contain system bandwidth information, a system frame number (SFN), and a Physical Hybrid-ARQ Indicator Channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain radio resource configuration (RRC) configuration information related to random access channel (RACH) procedures, paging, physical uplink control channel (PUCCH), physical uplink shared channel (PUSCH), power control, sounding reference signal (SRS), and cell barring.

In some embodiments, the UEs 115 and the BSs 105 may be operated by multiple network operators or network operating entities and may operate in a shared radio frequency spectrum band, which may include licensed or unlicensed frequency spectrum. In an unlicensed frequency portion of the shared radio frequency spectrum band, the UEs 115 or the BSs 105 may traditionally perform a medium-sensing procedure to contend for access to the frequency spectrum. For example, a UE 115 or a BS 105 may perform a listen before talk (LBT) procedure such as a clear channel assessment (CCA) prior to communicating in order to determine whether the shared channel is available. In addition, the UE 115 or the BS 105 may adjust its own backoff window based on channel measurements before contending for channel access. Medium-sensing can cause substantial signaling overhead in communications. This may be particularly evident when multiple network operating entities attempt to access a shared resource.

One approach to improving SS is to time-partition a shared spectrum according to network operating entities. In some embodiments, a BS 105 or an entity of the core network 130 may act as a central arbitrator to manage access and coordinate the partitioning of resources among different network operating entities operating within the network 100. The central arbitrator may include a spectrum access system (SAS), in some examples. In another example, the arbitration may be performed via network coordination and/or negotiation. In an embodiment, the network 100 may operate over a shared FDD spectrum including a UL frequency band and a DL frequency band. The FDD spectrum can be partitioned in time and/or frequency for coordinated SS among multiple network operating entities, as described in greater detail herein.

Figure 2:
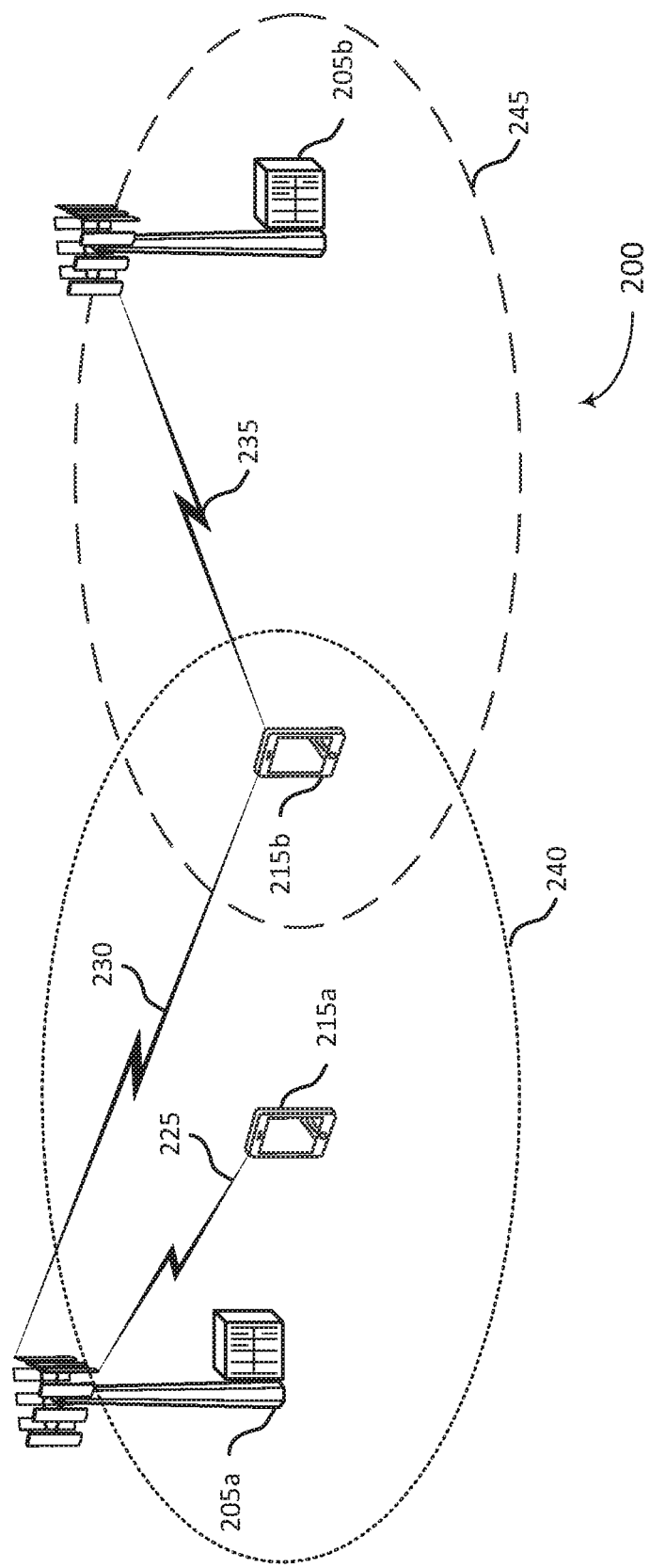
FIG. 2 illustrates an example of a wireless communications network that supports coordinated spectrum-sharing (SS) over a frequency-division duplexing (FDD) spectrum according to embodiments of the present disclosure.

FIG. 2 illustrates an example of a wireless communications network 200 that supports coordinated SS over a FDD spectrum according to embodiments of the present disclosure. The network 200 corresponds to a portion of the network 100. FIG. 2 illustrates two BSs 205 and two UEs 215 for purposes of simplicity of discussion, though it will be recognized that embodiments of the present disclosure may scale to many more UEs 215 and/or BSs 205. The BSs 205 are similar to the BSs 105. The UEs 215 are similar to the UEs 115. The BS 205a and BS 205b may communicate with the UEs 215 or other wireless devices within their respective coverage areas 240 and 245. The UEs 215 and the BS 205 may communicate with each other over a shared FDD spectrum including a DL spectrum and a UL spectrum.

In the network 200, the BS 205a may be operated by one or more network operating entities. For example, the BS 205a may be operated by a first network operating entity to communicate with the UE 215a via a communication link 225, and the BS 205a may be operated by a second network operating entity to communicate with the UE 215b via a communication link 230. Similarly, the BS 205b may also be operated by one or more network operating entities. In some embodiments, the BS 205b is operated by a third network operating entity to communicate with the UE 215b via communication link 235. In this embodiment, the UE 215b may be configured to operate with both the second and third network operating entities. In some embodiments, some of the communication links 225, 230, and 235 may share the same spectrum.

The FDD spectrum can be partitioned in time and/or frequency for coordinated SS among the multiple network operating entities. The transmissions from the multiple network operating entities can be time synchronized to facilitate the coordination. In one embodiment, the multiple network operating entities share the DL spectrum for DL transmissions and the UL spectrum for UL transmissions. The DL spectrum and the UL spectrum are partitioned into time intervals for the sharing. Each time interval includes resources in the DL spectrum and resources in the UL spectrum. Each time interval may be designated to a particular network operating entity or negotiated for use by a particular network operating entity, as described in greater detail herein. In each time interval, an assigned BS 205 can transmit DL signals to corresponding UEs 215 in the DL spectrum and receive UL signals from the corresponding UEs 215 from the UL spectrum. In addition, the BS 205 can receive signals from the DL spectrum, for example, for network listening. The UEs 215 can transmit UL signals to corresponding BSs 205 in the UL spectrum and receive DL signals from the corresponding BSs 205 from the DL spectrum. In addition, the UEs 215 can receive signals from the UL spectrum, for example, for network listening or device-to-device (D2D) communications. By limiting DL transmissions in the DL spectrum and UL transmissions in the UL spectrum, SS can be applied to both macro cells (e.g., the coverage areas 110a, 110b, and 110c) and small cells (e.g., the coverage area 110d).

In another embodiment, the multiple network operating entities share the UL spectrum for both UL and DL transmissions in a TDD mode and share the DL spectrum for both UL and DL transmissions in a TDD mode. Thus, the UL spectrum and the DL spectrum are treated as two separate independent shared TDD spectra. The DL spectrum and the UL spectrum are separately partitioned into time intervals for sharing. Each time interval may include resources in the DL spectrum or the UL spectrum and used by a particular network operating entity based on assignments or negotiations. In each time interval, an assigned BS 205 can communicate with corresponding UEs 215 in a TDD mode. Since DL transmissions can be in the UL spectrum and UL transmissions can be in the DL spectrum, the sharing may be further partitioned into power classes to allow for SS in macro cells and small cells, as described in greater detail herein.

Figure 3:
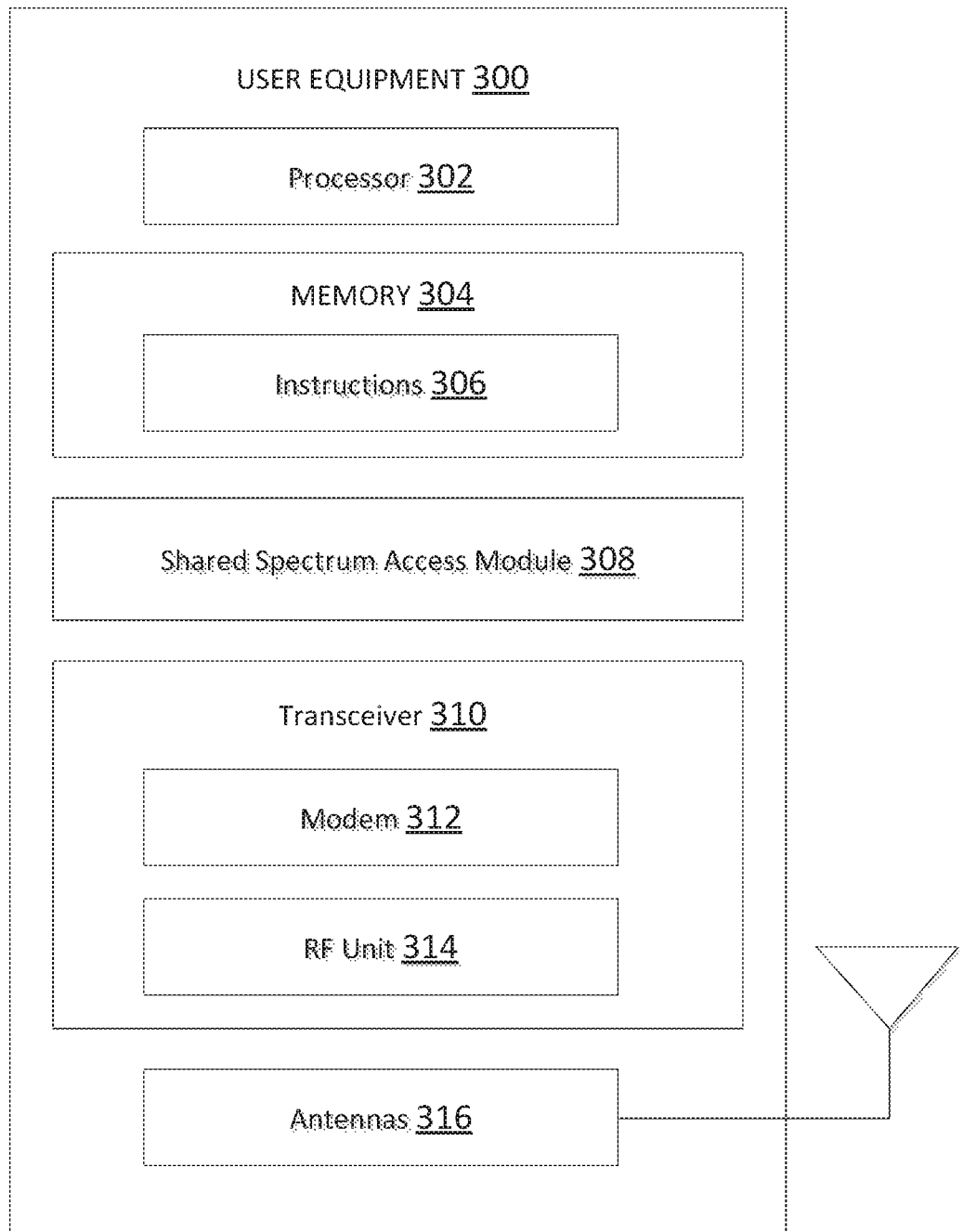
FIG. 3 is a block diagram of an exemplary user equipment (UE) according to embodiments of the present disclosure.

FIG. 3 is a block diagram of an exemplary UE 300 according to embodiments of the present disclosure. The UE 300 may be a UE 115 or 215 as discussed above. As shown, the UE 300 may include a processor 302, a memory 304, a shared spectrum access module 308, a transceiver 310 including a modem subsystem 312 and a RF unit 314, and an antenna 316. These elements may be in direct or indirect communication with each other, for example via one or more buses.

The processor 302 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 304 includes a non-transitory computer-readable medium. The memory 304 may store instructions 306. The instructions 306 may include instructions that, when executed by the processor 302, cause the processor 302 to perform the operations described herein with reference to the UEs 215 in connection with embodiments of the present disclosure. Instructions 306 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The shared spectrum access module 308 may be used for various aspects of the present disclosure. For example, the shared spectrum access module 308 is configured to identify transmission opportunities in a shared spectrum, perform network listening, and reserve time intervals for using the shared spectrum, as described in greater detail herein.

As shown, the transceiver 310 may include the modem subsystem 312 and the RF unit 314. The transceiver 310 can be configured to communicate bi-directionally with other devices, such as the BSs 105 and 205. The modem subsystem 312 may be configured to modulate and/or encode the data from the memory 304 and/or the shared spectrum access module 308 according to a modulation and coding scheme (MCS), e.g., a low-density parity check (LDPC) coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data from the modem subsystem 312 (on outbound transmissions) or of transmissions originating from another source such as a UE 215 or a BS 205. The RF unit 314 may be further configured to perform analog beamforming in conjunction with the digital beamforming. Although shown as integrated together in transceiver 310, the modem subsystem 312 and the RF unit 314 may be separate devices that are coupled together at the UE 215 to enable the UE 215 to communicate with other devices.

The RF unit 314 may provide the modulated and/or processed data, e.g. data packets (or, more generally, data messages that may contain one or more data packets and other information), to the antenna 316 for transmission to one or more other devices. This may include, for example, transmission of channel reservation signals clear-to-send (CTS) signals according to embodiments of the present disclosure. The antenna 316 may further receive data messages transmitted from other devices. This may include, for example, reception of request-to-send (RTS) and/or CTS signals according to embodiments of the present disclosure. The antenna 316 may provide the received data messages for processing and/or demodulation at the transceiver 310. Although FIG. 3 illustrates antenna 316 as a single antenna, antenna 316 may include multiple antennas of similar or different designs in order to sustain multiple transmission links. The RF unit 314 may configure the antenna 316.

Figure 4:
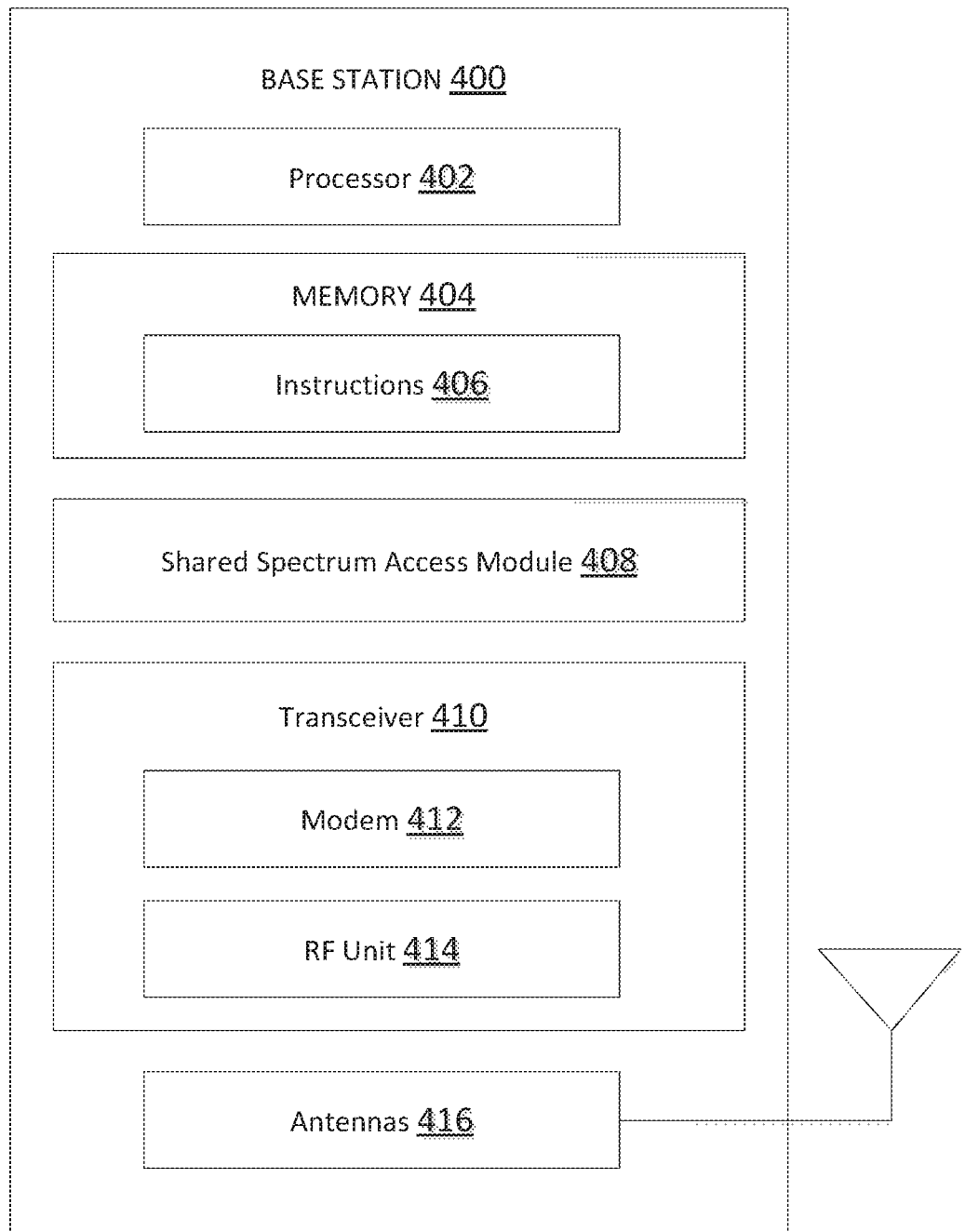
FIG. 4 is a block diagram of an exemplary base station (BS) according to embodiments of the present disclosure.

FIG. 4 is a block diagram of an exemplary BS 400 according to embodiments of the present disclosure. The BS 400 may be a BS 105 or 205 as discussed above. A shown, the BS 400 may include a processor 402, a memory 404, a shared spectrum access module 408, a transceiver 410 including a modem subsystem 412 and a RF unit 414, and an antenna 416. These elements may be in direct or indirect communication with each other, for example via one or more buses.

The processor 402 may have various features as a specific-type processor. For example, these may include a CPU, a DSP, an ASIC, a controller, a FPGA device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 404 may include a non-transitory computer-readable medium. The memory 404 may store instructions 406. The instructions 406 may include instructions that, when executed by the processor 402, cause the processor 402 to perform operations described herein. Instructions 406 may also be referred to as code, which may be interpreted broadly to include any type of computer-readable statement(s) as discussed above with respect to FIG. 4.

The shared spectrum access module 408 may be used for various aspects of the present disclosure. For example, the shared spectrum access module 408 may identify transmission opportunities in a shared spectrum, perform network listening, and reserve time intervals for using the shared spectrum monitor, as described in greater detail herein.

As shown, the transceiver 410 may include the modem subsystem 412 and the RF unit 414. The transceiver 410 can be configured to communicate bi-directionally with other devices, such as the UEs 115 and 215 and/or another core network element. The modem subsystem 412 may be configured to modulate and/or encode data according to a MCS, e.g., a LDPC coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 215. The RF unit 414 may be further configured to perform analog beamforming in conjunction with the digital beamforming. Although shown as integrated together in transceiver 410, the modem subsystem 412 and the RF unit 414 may be separate devices that are coupled together at the BS 205 to enable the BS 205 to communicate with other devices.

The RF unit 414 may provide the modulated and/or processed data, e.g. data packets (or, more generally, data messages that may contain one or more data packets and other information), to the antenna 416 for transmission to one or more other devices. This may include, for example, transmission of information to complete attachment to a network and communication with a camped UE 215 according to embodiments of the present disclosure. The antenna 416 may further receive data messages transmitted from other devices and provide the received data messages for processing and/or demodulation at the transceiver 410. Although FIG. 4 illustrates antenna 416 as a single antenna, antenna 416 may include multiple antennas of similar or different designs in order to sustain multiple transmission links.

Figure 5:
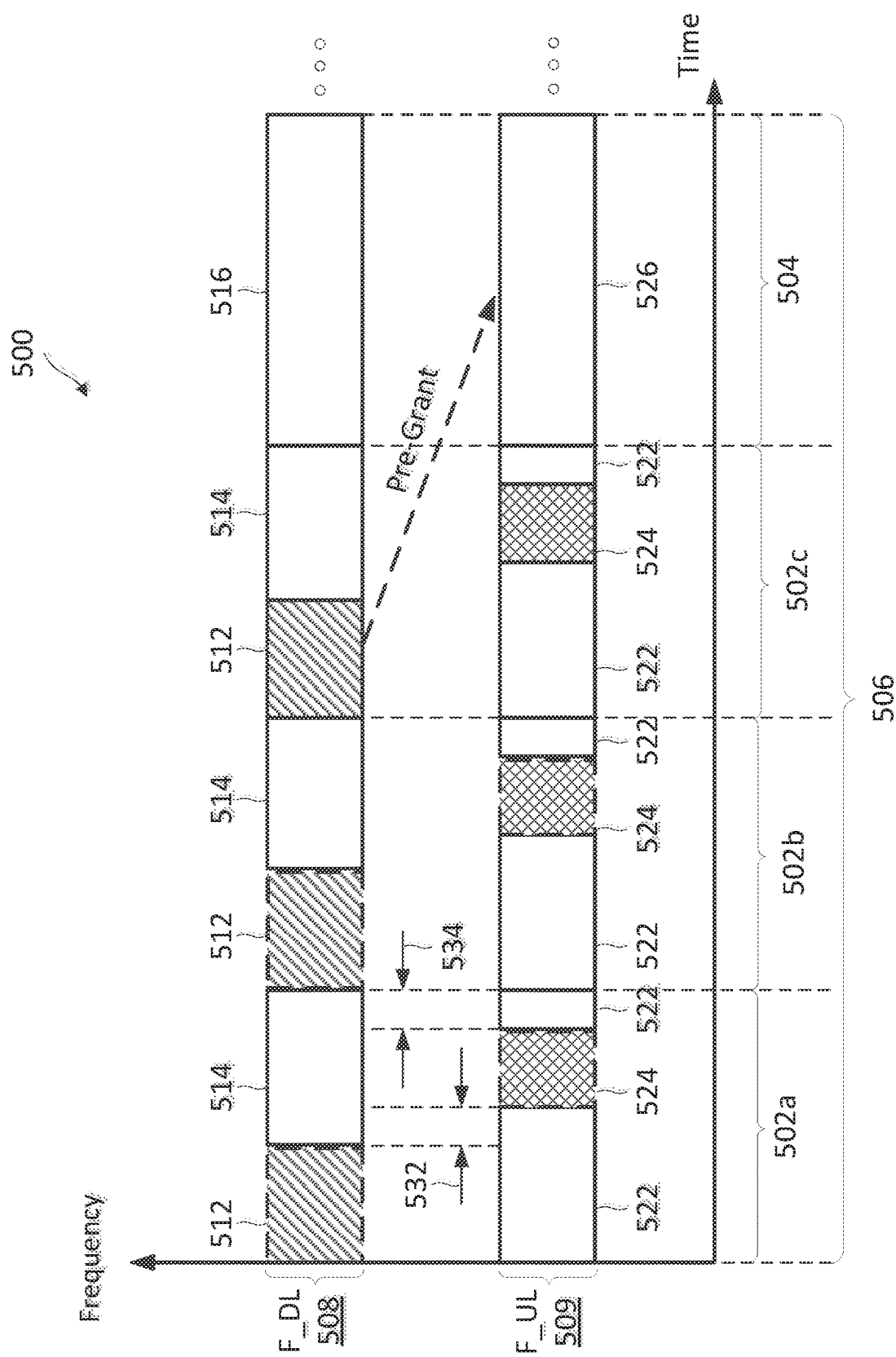
FIG. 5 is a timing diagram illustrating a coordinated SS scheme for sharing a FDD spectrum among multiple network operating entities according to embodiments of the present disclosure.

FIGS. 5-8 illustrate several coordinated SS schemes for sharing a FDD spectrum by limiting UL transmissions in a UL frequency band and DL transmissions in a DL frequency band. In FIGS. 5-8, the x-axes represent time in some constant units and the y-axes represents frequency in some constant units. FIG. 5 is a timing diagram illustrating a coordinated SS scheme 500 for sharing a FDD spectrum among multiple network operating entities according to embodiments of the present disclosure. The scheme 500 may be employed by the BSs 105 and 205 and the UEs 115 and 215. In the scheme 500, a FDD spectrum including a DL frequency band 508, denoted as f_DL, and a UL frequency band 509, denoted as f_UL, is partitioned into TXOP frames 506. The DL frequency band 508 and the UL frequency band 509 may be spaced apart in frequencies as shown in FIG. 5 or contiguous in frequencies. Each TXOP frame 506 includes a plurality of channel sensing time slots 502 at the beginning of the TXOP frame 506, followed by a transmission time slot 504.

Each channel sensing time slot 502 is assigned to a particular network operating entity. Thus, the number of channel sensing time slots 502 may be dependent on the number of network operators in a network. For example, a network with N network operators may include up to N channel sensing time slots 502 in a TXOP frame 506. The channel sensing time slots 502 can be arranged in a TXOP frame 506 based on communication priorities, for example, in a descending order. As an example, the scheme 500 serves three network operators A, B, and C, where the operator A has the highest communication priority and the operator C has the lowest communication priority. Thus, the channel sensing time slots 502a, 502b, and 502c may be assigned to the network operators A, B, and C, respectively.

In each channel sensing time slot 502, a BS of the assigned network operating entity may reserve a following transmission time slot 504 in the TXOP frame 506 for communications with UEs of the assigned network operating entity. In addition, the BS and the UEs may exchange other UL and DL information during in the channel sensing time slot 502. For example, a BS may send a RTS signal 512 in the DL frequency band 508 to reserve the following transmission time slot 504 for communications with corresponding UEs and the corresponding UEs may respond with a CTS signal 524 in the UL frequency band 509.

While the BS is transmitting the RTS signal 512 in the DL frequency band 508 or processing the CTS signal 524 (e.g., in a time period 534), the UEs may send other UL signals 522 to the BS in the UL frequency band 509. The UL signals 522 can carry timing-critical or timing-sensitive information, which may include UL control information or reference signals (e.g., SRS). The UL control information may be similar to the signals carried in a PUCCH, which may include a scheduling request (SR), a hybrid automatic request control (HARQ) acknowledgement (ACK)/not-ACK (NAK), a channel indicator (CQI), and channel state information (CSI). Similarly, while a UE is transmitting the CTS signal 524 in the UL frequency band 509 or processing the RTS signal 512 (e.g., in a time period 532), the BS may send other DL signals 514 to the UEs in the DL frequency band 508. The DL signals 514 can carry timing-critical or timing-sensitive information, which may include DL control information similar to information carried in a PDCCH channel or reference signals, such as a channel state information-reference signal (CSI-RS). The transmissions of the DL signals 514 and/or the UL signals 522 may be according to a pre-configured schedule, for example, configured by upper layers such as a RRC layer.

In operation, a BS of a particular network operating entity may listen for RTS signals 512 and/or CTS signals 524 from higher priority network operating entities in the channel sensing time slots 502. Similarly, a UE of the particular network operating entity may listen for RTS signals 512 and/or CTS signals 524 from the higher priority network operating entities in the channel sensing time slots 502. For example, a BS of the network operator C may listen for RTS signals 512 in the channel sensing time slots 502a and 502b and a UE of the network operator C may listen for CTS signals 524 in the channel sensing time slots 502a and 502b. A RTS signal 512 may include a pre-determined preamble sequence known by the network operating entities. In addition, the RTS signal 512 may include a payload, for example, indicating UL and/or DL scheduling information as described more fully below. The listening of the RTS signals 512 is referred to as channel sensing. For example, channel sensing may include energy detection for the presence of a RTS signal 512, detection of the pre-determined preamble, and/or detection of the payload. When no RTS signal 512 is detected, the BS may transmit a RTS signal 512 in the assigned channel sensing time slot 502c to reserve the transmission time slot 504 for communications with corresponding UEs. In addition, a RTS signal 512 can include DL and UL scheduling information, which may include one or more transmission pre-grants for one or more of the corresponding UEs. A UE assigned with a transmission grant may respond by sending a CTS signal 524. For example, a UE may send the CTS signal 524 when no CTS signals 524 and/or RTS signals 512 are detected in the channel sensing time slots 502a and 502b. The assigned UEs may transmit UL data 526 to the BS in the transmission time slot 504 according to the transmission pre-grants. Similarly, the BS may transmit DL data 516 to the assigned UEs in the transmission time slot 504 according to the transmission pre-grants.

When the BS detects a RTS signal 512 in the channel sensing time slot 502a or 502b, the BS may not use the transmission time slot 504, thus avoiding collision. In some embodiments, the transmission time slot 504 may begin immediately after the channel sensing time slot 502 of a winning BS. For example, when a BS of the network operator B successfully reserve the transmission time slot 504. The transmission time slot 504 may begin immediately after the channel sensing time slot 502b. Thus, in such embodiments, the network operator C may avoid using the channel sensing time slot 502c.

Figure 6:
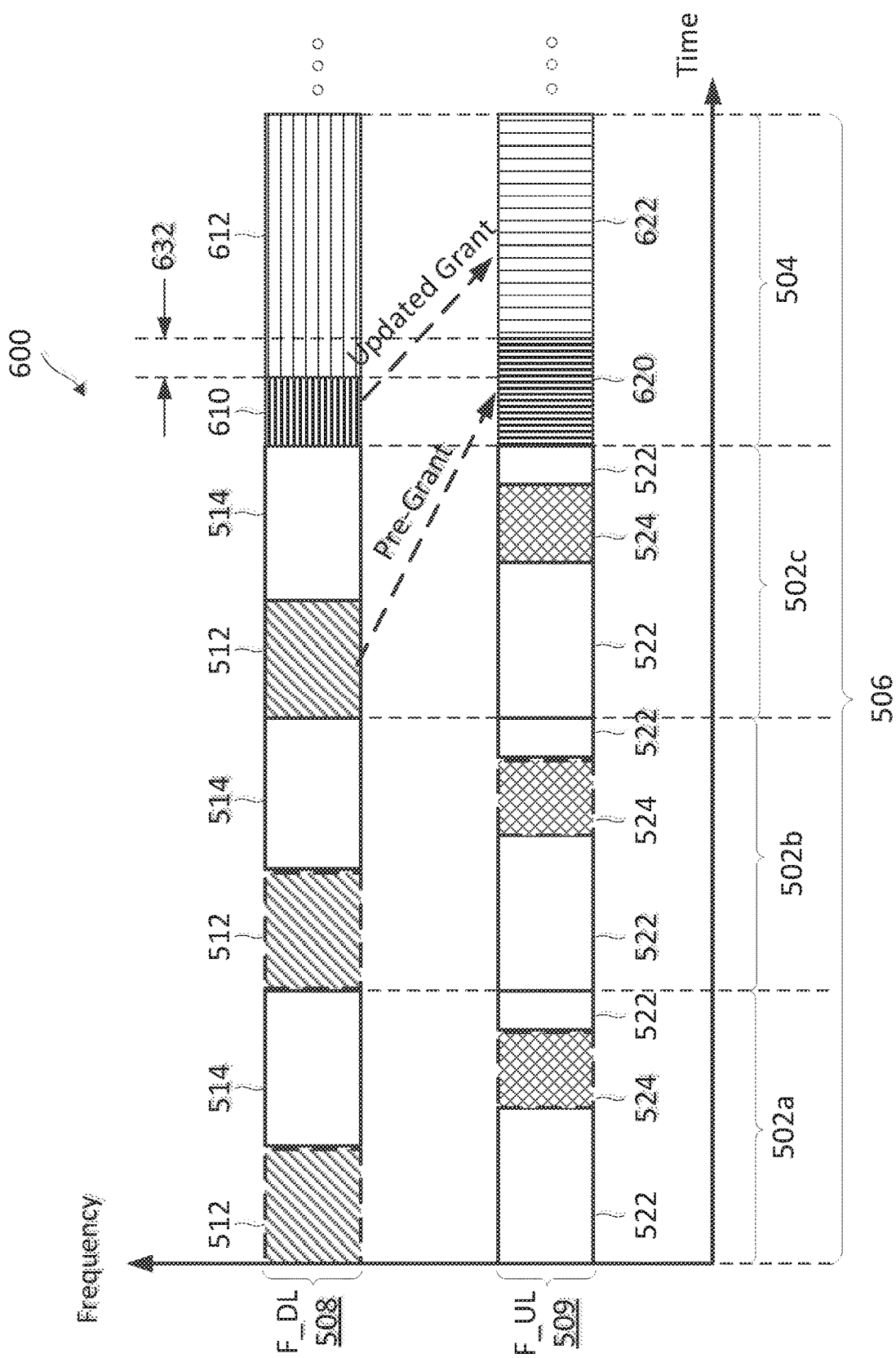
FIG. 6 is a timing diagram illustrating a coordinated SS scheme for sharing a FDD spectrum among multiple network operating entities according to embodiments of the present disclosure.

FIG. 6 is a timing diagram illustrating a coordinated SS scheme 600 for sharing a FDD spectrum among multiple network operating entities according to embodiments of the present disclosure. The scheme 600 is similar to the scheme 500. However, in the scheme 600, a BS may update the scheduling information sent in the channel sensing time slots 502 based on CTS signals 524 received from corresponding UEs. For example, the BS of the network operator C may send a RTS signal 512 in the assigned channel sensing time slot 502c and may include 10 transmission pre-grants for 10 UEs, but may only receive CTS signals 524 from 5 of the UEs. To better utilize the spectrum, the BS may update the scheduling information (e.g., including updated grants) and send the updated scheduling information 610 at the beginning of the transmission time slot 504. One or more of the 5 UEs may send UL data 620 in the transmission time slot 504 according to the pre-grants while the BS sends the updated scheduling information 610 and the UEs process the updated scheduling information 610 (e.g., in a period 632). Subsequently, one or more of the 5 UEs may send UL data 622 in the transmission time slot 504 according to the updated grants. The BS may send DL data 612 in the transmission time slot 504 according to the updated scheduling information 610. In addition, the BS and/or the UEs may update beamforming according to the updated scheduling information. Thus, the scheme 600 may be more efficient in spectrum utilization than the scheme 500.

Figure 7:
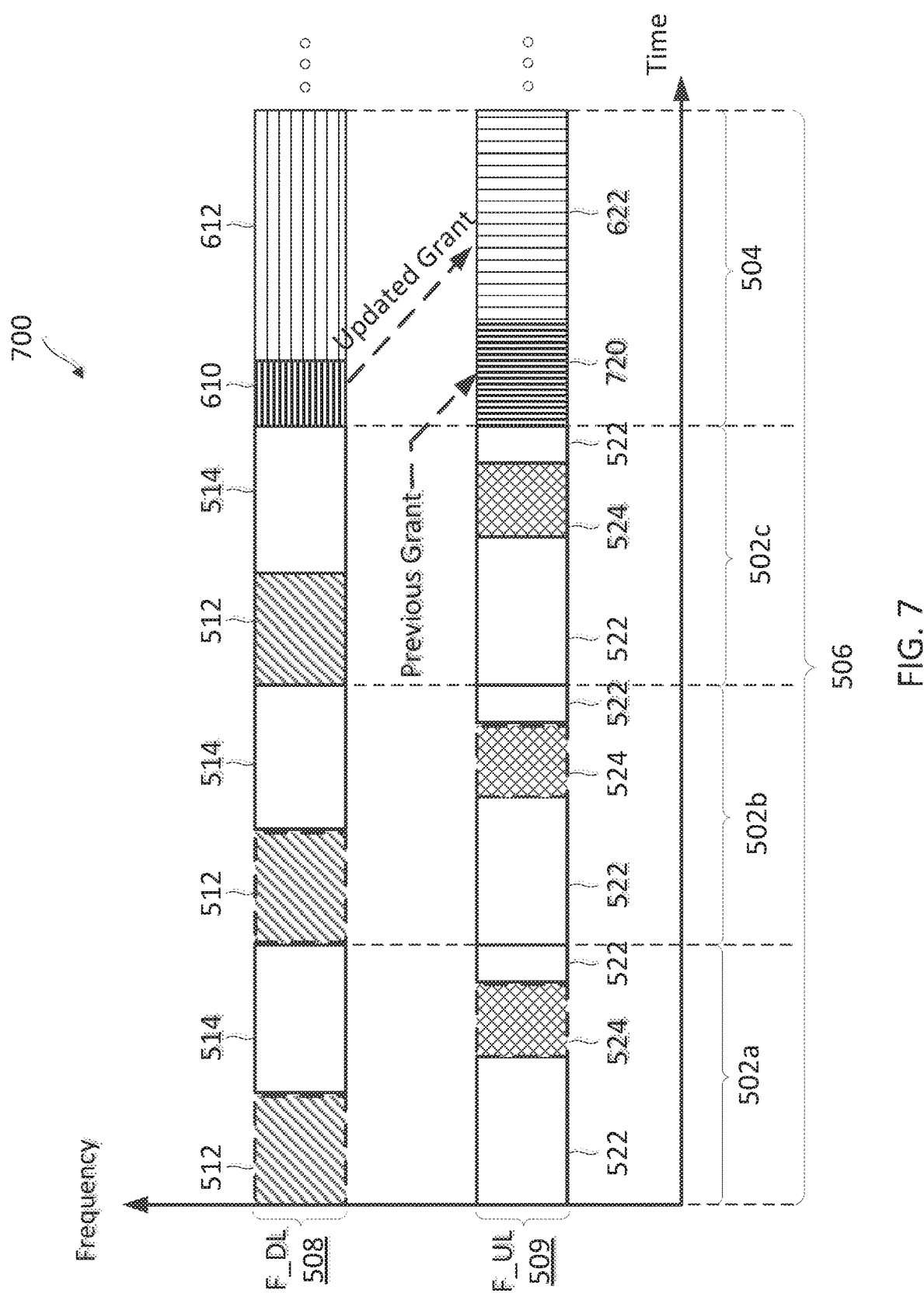
FIG. 7 is a timing diagram illustrating a coordinated SS scheme for sharing a FDD spectrum among multiple network operating entities according to embodiments of the present disclosure.

FIG. 7 is a timing diagram illustrating a coordinated SS scheme 700 for sharing a FDD spectrum among multiple network operating entities according to embodiments of the present disclosure. The scheme 700 is similar to the scheme 600. For example, a BS may update the scheduling information sent in the channel sensing time slots 502 based on CTS signals 524 received from corresponding UEs. However, in the scheme 700, the UEs may transmit UL data 720 in the transmission time slot 504 while the BS transmits the updated scheduling information 610 or while the UE processes the updated scheduling information (e.g., in the period 632) based on previous scheduling information received from a previous TXOP frame 506 instead of based on pre-grants as in the scheme 600.

Figure 8:
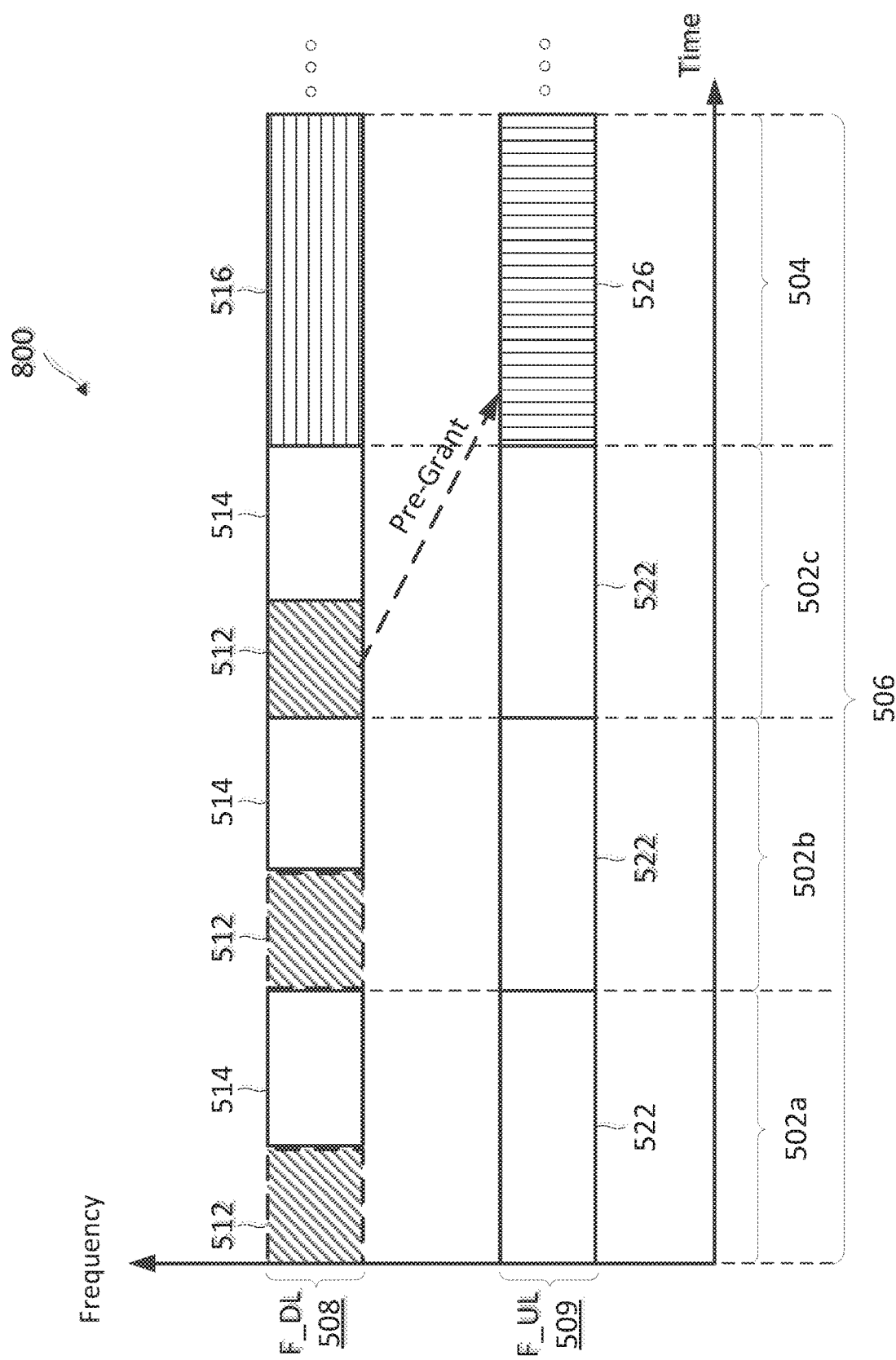
FIG. 8 is a timing diagram illustrating a coordinated SS scheme for sharing a FDD spectrum among multiple network operating entities according to embodiments of the present disclosure.

FIG. 8 is a timing diagram illustrating a coordinated SS scheme 800 for sharing a FDD spectrum among multiple network operating entities according to embodiments of the present disclosure. The scheme 800 is similar to the scheme 500. However, in the scheme 800, the UEs do not respond with CTS signals 524 as in the scheme 500 and channel sensing is based on monitoring of RTS signals 512 (e.g., preamble and/or payload) by the BSs. In one embodiment, a RTS signal 512 or the preamble may carry pre-grant information as shown. In another embodiment, a BS that reserved the medium for the transmission time slot 504 may transmit transmission grants (e.g., the scheduling information 610) in the transmission time slot 504, for example, before transmitting the DL data 516 similar to the schemes 600 and 700. In such an embodiment, a corresponding UE may transmit UL data in the transmission time slot 504 while the BS transmits the updated scheduling information and/or while the UE processes the updated scheduling information. The transmission of the UL data may be based on previous scheduling information received from a previous TXOP frame 506.

Figure 9:
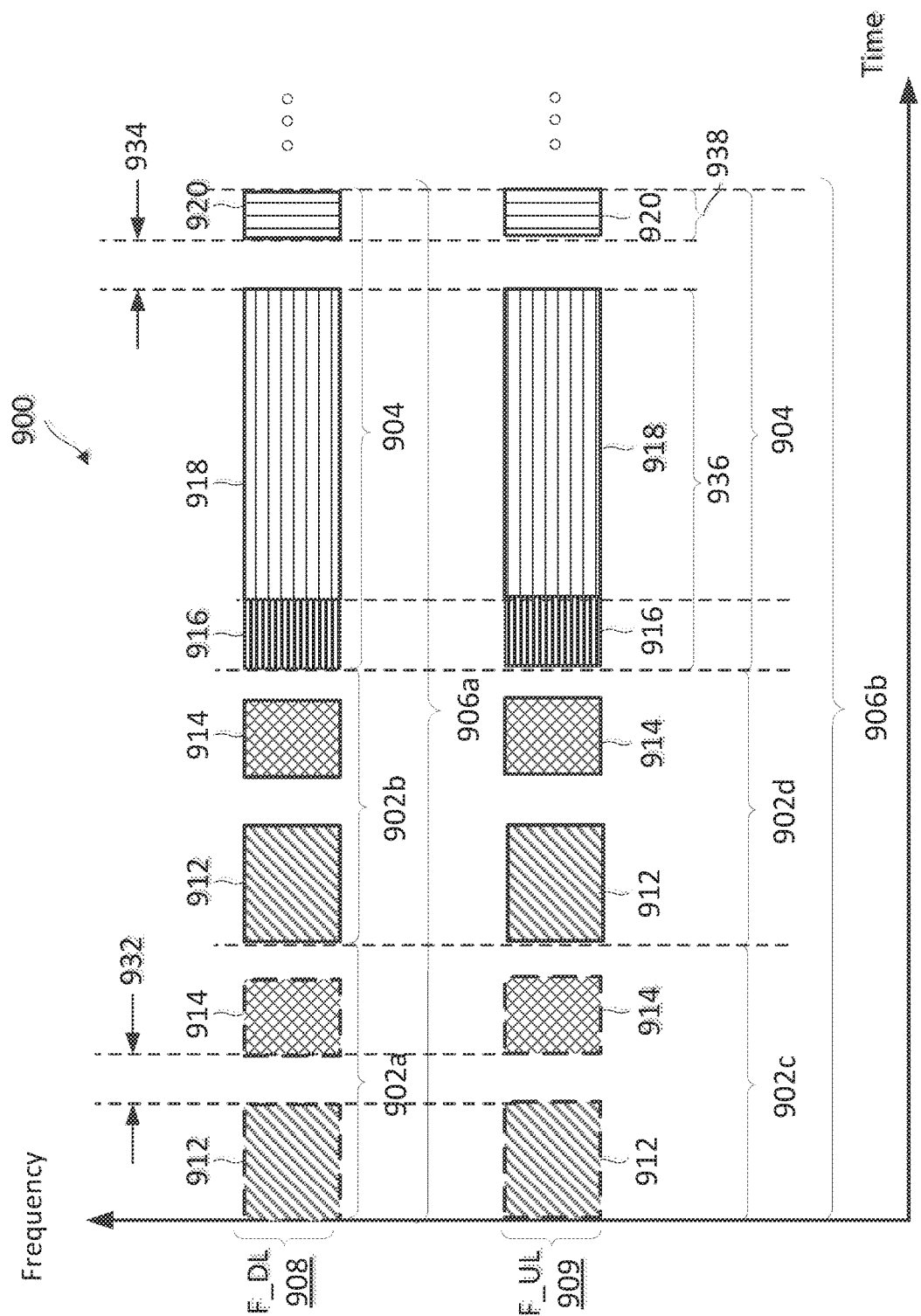
FIG. 9 is a timing diagram illustrating a coordinated SS scheme for sharing a FDD spectrum among multiple network operating entities operating in a time-division duplexing (TDD) mode according to embodiments of the present disclosure.

FIG. 9 is a timing diagram illustrating a coordinated SS scheme 900 for sharing a FDD spectrum among multiple network operating entities operating in a TDD mode according to embodiments of the present disclosure. The scheme 900 may be employed by the BSs 105 and 205 and the UEs 115 and 215. In FIG. 9, the x-axis represents time in some constant units and the y-axis represents frequency in some constant units. In the scheme 900, a FDD spectrum includes a DL frequency band 908, denoted as f_DL, and a UL frequency band 909, denoted as f_UL. The DL frequency band 908 may be similar to the DL frequency band 508 and the UL frequency band 509 may be similar to the UL frequency band. However, each of the DL frequency band 908 and the UL frequency band 909 is partitioned into TXOP frames 906. In some embodiments, the timings of the TXOP frames 906a in the DL frequency band 908 and the TXOP frames 906b in the UL frequency band 909 are aligned as shown in FIG. 9. In some other embodiments, the timings of the TXOP frames 906a may be independent of the TXOP frames 906b, where the UL frequency band 909 and the DL frequency band 908 operate as independent channels. Each TXOP frame 906 includes a plurality of channel sensing time slots 902, followed by a transmission time slot 904. The sharing of the UL frequency band 909 and the sharing of the DL frequency band 908 are independent of each other. Thus, the UL frequency band 909 and the DL frequency band 908 may function as two separate TDD spectra. BSs and UEs of multiple network operating entities may use the channel sensing time slots 902 and the transmission time slots 904 by employing similar sharing and coordinating mechanisms as in the schemes 500-800 described above. However, UL and DL transmissions occur in a TDD mode, where UL and DL transmissions from a particular network operating entity occur at different time intervals over the same frequency band (e.g., the UL frequency band 909 or the DL frequency band 908).

Similar to the scheme 500, the channel sensing time slots 902 are arranged in descending priorities in each TXOP frame 906 and each channel sensing time slot 902 may be assigned to a particular network operating entity. As an example, the channel sensing time slots 902a and 902b in the DL frequency band 908 may be assigned to a network operator A and a network operator B, respectively, where the network operator A has a higher communication priority than the network operator B. Similarly, the channel sensing time slots 902c and 902d in the UL frequency band 909 may be assigned to a network operator C and a network operator D, respectively, where the network operator C has a higher communication priority than the network operator D.

In each channel sensing time slot 902, a BS of the assigned network operating entity may send a RTS signal 912 similar to the RTS signals 512 to reserve the following transmission time slot 904 in a corresponding UL frequency band 909 or DL frequency band 908 for communications with corresponding UEs. The UEs may respond with CTS signals 914 similar to the CTS signals 524 after a DL/UL switching time 932. The BS may transmit scheduling information 916 (e.g., DL grants and UL grants) at the beginning of the transmission time slot 904 followed by DL data 918 according to the scheduling information 916. After a DL/UL switching time 934, the corresponding UEs may transmit UL data 920 according to the scheduling information 916. In some embodiments, the BS may configure the transmission time slot 904 for DL centric transmission as shown, where a DL portion 936 assigned for the DL transmission has a longer duration than an UL portion 938 assigned for UL transmission. In some other embodiments, the BS may configure the transmission time slot 904 for UL centric transmission. For example, the DL portion 936 may have a shorter duration than the UL portion 938. In some embodiments, the medium reservation may be similar to the scheme 800, where the reservation is performed via preamble transmission and monitoring instead of exchanging RTS signals 912 and CTS signals 914 as shown in FIG. 9.

The scheme 900 may be applied in both macro cells (e.g., the coverage areas 110*a*, 110*b*, and 110*c*) and small cells (e.g., the coverage area 110*d*). Since both UL and DL transmissions can occur in each of the UL frequency and the DL frequency band 908 and macro BSs may have a significantly higher transmit power than small cell BSs or UEs, the BSs and UEs of a particular network operating entity may be grouped into sub-network operating entities based on corresponding power classes (e.g., maximum transmit power). Each sub-network operating entity may be assigned a channel sensing time slot 902. For example, the channel sensing time slot 902*a* may be assigned to a high power class sub-network operating entity of a network operator A and the channel sensing time slot 902*b* may be assigned to a low power class sub-network operating entity of the network operator A. In some embodiments, the scheme 900 may include interference management mechanisms for dynamic TDD operations to consider and minimize cross link interference. For example, a DL transmitter may yield to a RTS signal sent from a BS or a UL transmitter may yield to a CTS signal sent from a UE.

In the schemes 500-900, the configurations for the TXOP frame 506 and 906, the channel sensing time slots 502 and 902, and the transmission time slots 504 and 904 may be semi-statically configured by a central authority, for example, a particular BS or an entity in the core network 130. The BSs may dynamically schedule resources within corresponding assigned channel sensing time slots 502 and 902 and within negotiated transmission time slots 504 and 904.

Figure 10:
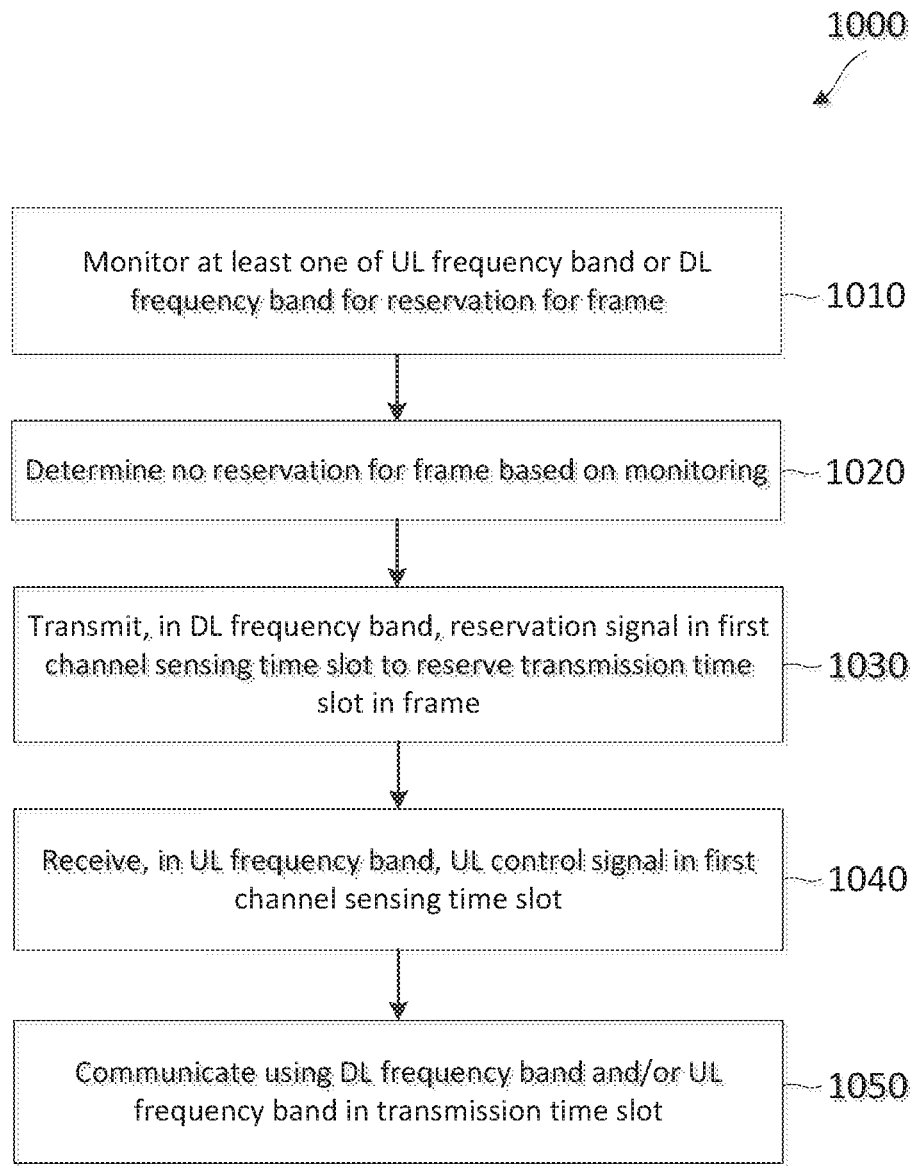
FIG. 10 is a flow diagram of a method of performing SS in a shared FDD spectrum according to embodiments of the present disclosure.

FIG. 10 is a flow diagram of a method 1000 of performing SS in a shared FDD spectrum according to embodiments of the present disclosure. Steps of the method 1000 can be executed by a computing device (e.g., a processor, processing circuit, and/or other suitable component) of a wireless communication device, such as the BSs 105, 205, and 400. The method 1000 may employ similar mechanisms as in the schemes 500-800 described with respect to FIGS. 5-8, respectively. As illustrated, the method 1000 includes a number of enumerated steps, but embodiments of the method 1000 may include additional steps before, after, and in between the enumerated steps. In some embodiments, one or more of the enumerated steps may be omitted or performed in a different order.

At step 1010, the method 1000 includes monitoring at least one of a UL frequency band (e.g., the UL frequency band 509) or a DL frequency band (e.g., the DL frequency band 508) for a reservation for a frame (e.g., the TXOP frame 506). The UL frequency band and the DL frequency band are part of a FDD spectrum shared by a plurality of networking operating entities. For example, the wireless communication device is associated with a first network operating entity of the plurality of network operating entities, which may be assigned with a first channel sensing time slot (e.g., the first channel sensing time slot 502) in the frame. The monitoring may include detecting for a reservation signal from another network operating entity in one or more channel sensing time slots before the first channel sensing time slot in the frame. For example, the reservation signal may include a RTS signal (e.g., the RTS signals 512) transmitted by a BS of the another network operating entity and/or a CTS signal (e.g., the CTS signals 524) transmitted by a UE of the another network operating entity. The another network operating entity may have a higher communication priority than the first network operating entity.

At step 1020, the method 1000 includes determining that there is no reservation for the frame from another network operating entity based on the monitoring. At step 1030, the method 1000 includes transmitting, in the DL frequency band, a reservation signal in the first channel sensing time slot to reserve for a transmission time slot (e.g., the transmission time slot 504) in the frame. The reservation signal may include a pre-determined preamble known to the network operating entities. In addition, the reservation signal may include scheduling information.

At step 1040, the method 1000 includes receiving, in the UL frequency band, a UL control signal in first channel sensing time slot, for example, from a UE (e.g., the UEs 215) associated with the first network operating entity. The UL control signal may include UL control information and/or a reference signal. The UL control signal may be received while transmitting the reservation signal.

At step 1050, the method 1000 includes communicating, for example, with one or more corresponding UEs, using the DL frequency band and/or the UL frequency band in the transmission time slot. The communication may be based on the scheduling information transmitted in the first channel sensing time slot (e.g., the schemes 500, 600, and 800). The communication may be based on updated scheduling information (e.g., the scheme 600 and 700) or scheduling information transmitted in a previous frame (e.g., the scheme 700).

Figure 11:
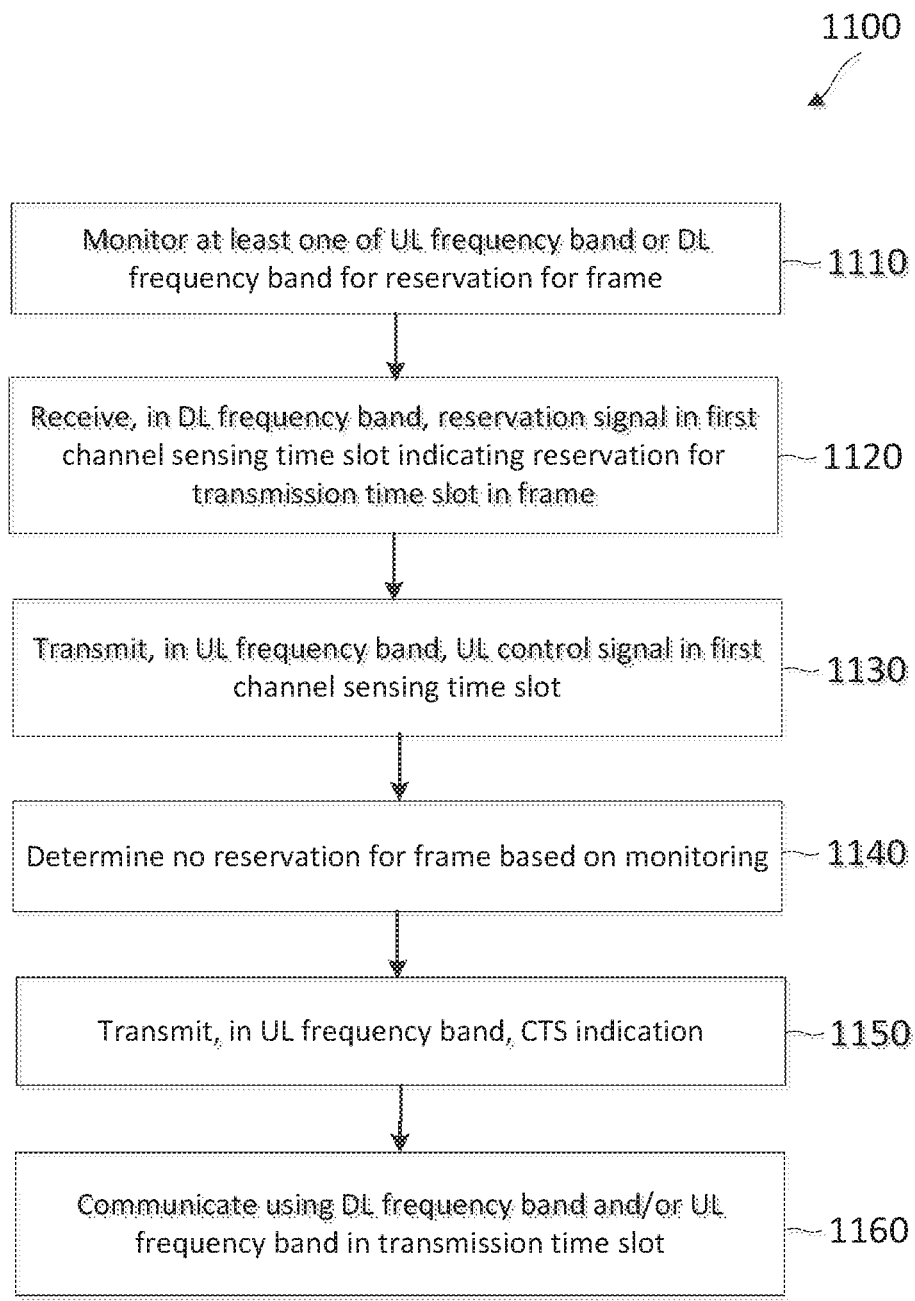
FIG. 11 is a flow diagram of a method of performing SS in a shared FDD spectrum according to embodiments of the present disclosure.

FIG. 11 is a flow diagram of a method 1100 of performing SS in a shared FDD spectrum according to embodiments of the present disclosure. Steps of the method 1100 can be executed by a computing device (e.g., a processor, processing circuit, and/or other suitable component) of a wireless communication device, such as the UEs 115, 215, and 300. The method 1100 may employ similar mechanisms as in the schemes 500-800 described with respect to FIGS. 5-8, respectively. As illustrated, the method 1100 includes a number of enumerated steps, but embodiments of the method 1100 may include additional steps before, after, and in between the enumerated steps. In some embodiments, one or more of the enumerated steps may be omitted or performed in a different order.

At step 1110, the method 1100 includes monitoring at least one of a UL frequency band (e.g., the UL frequency band 509) or a DL frequency band (e.g., the DL frequency band 508) for a reservation for a frame (e.g., the TXOP frame 506). The UL frequency band and the DL frequency band are part of a FDD spectrum shared by a plurality of networking operating entities. For example, the wireless communication device is associated with a first network operating entity of the plurality of network operating entities, which may be assigned with a first channel sensing time slot (e.g., the first channel sensing time slot 502) in the frame. The monitoring may include detecting for a reservation signal from another network operating entity in one or more channel sensing time slots before the first channel sensing time slot in the frame. For example, the reservation signal may include a RTS signal (e.g., the RTS signals 512) transmitted by a BS of the another network operating entity and/or a CTS signal (e.g., the CTS signals 524) transmitted by a UE of the another network operating entity. The another network operating entity may have a higher communication priority than the first network operating entity.

At step 1120, the method 1100 includes receiving, in the DL frequency band, a reservation signal in the first channel sensing time slot. The reservation signal indicates a reservation for a transmission time slot (e.g., the transmission time slot 504) in the frame. The reservation signal may include a pre-determined preamble known to the network operating entities. In addition, the reservation signal may include scheduling information.

At step 1130, the method 1100 includes transmitting in the UL frequency band, an UL control signal in the first channel sensing time slot. The UL control signal may be transmitted while receiving the reservation signal.

At step 1140, the method 1100 includes determining that there is no reservation for the frame from another network operating entity based on the monitoring. At step 1150, the method 1100 includes transmitting, in the UL frequency band, a CTS indication in the first channel sensing time slot in response to the reservation signal. In some embodiments, the step 1140 may be optional (e.g., the scheme 800).

At step 1160, the method 1000 includes communicating, for example, with the BS, using the DL frequency band and/or the UL frequency band in the transmission time slot. The communication may be based on the scheduling information received in the first channel sensing time slot (e.g., the schemes 500, 600, and 800). The communication may be based on updated scheduling information (e.g., the scheme 600 and 700) or scheduling information received from a previous frame (e.g., the scheme 700).

Figure 12:
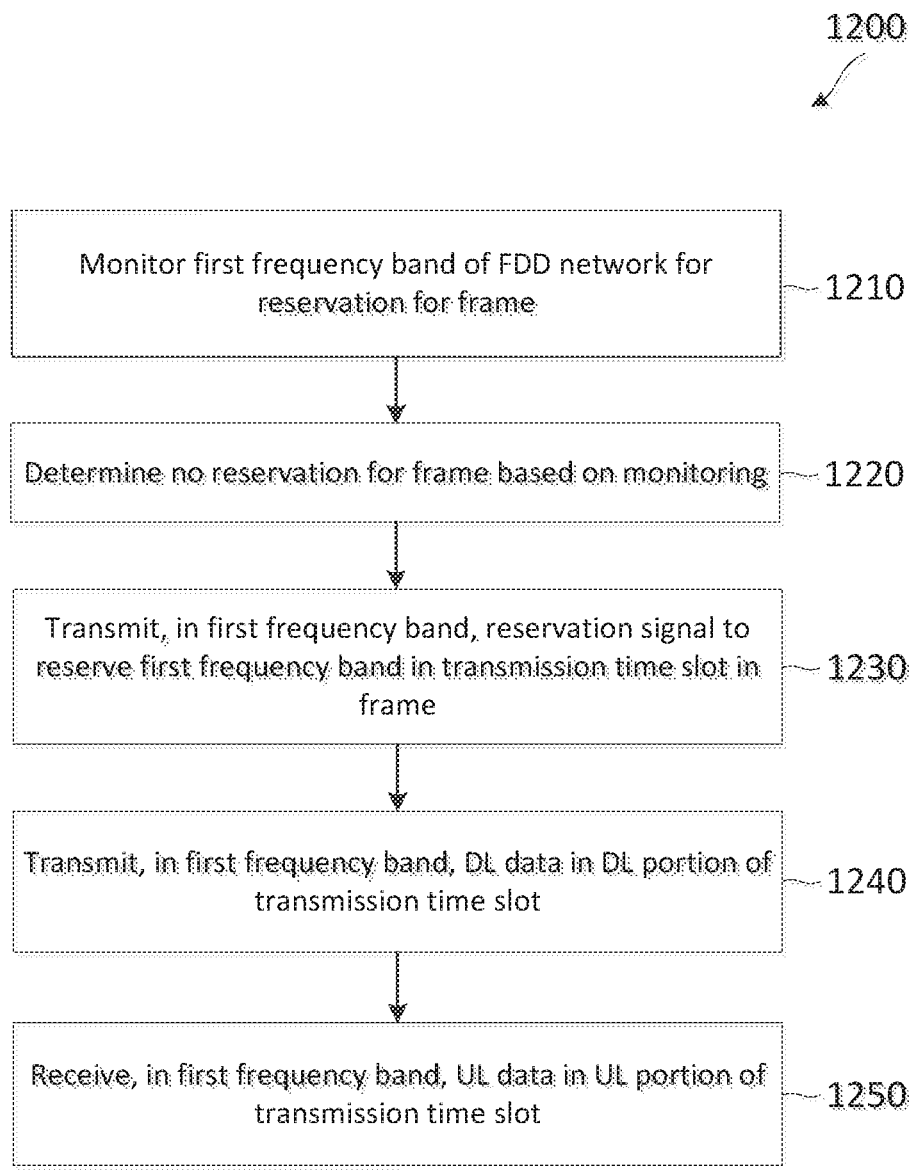
FIG. 12 is a flow diagram of a method of performing SS in a shared FDD spectrum according to embodiments of the present disclosure.

FIG. 12 is a flow diagram of a method 1200 of performing SS in a shared FDD spectrum according to embodiments of the present disclosure. Steps of the method 1200 can be executed by a computing device (e.g., a processor, processing circuit, and/or other suitable component) of a wireless communication device, such as the BSs 105, 205, and 400. The method 1200 may employ similar mechanisms as in the scheme 900 described with respect to FIG. 9, respectively. As illustrated, the method 1200 includes a number of enumerated steps, but embodiments of the method 1200 may include additional steps before, after, and in between the enumerated steps. In some embodiments, one or more of the enumerated steps may be omitted or performed in a different order.

At step 1210, the method 1200 includes monitoring a first frequency band for a reservation for a frame (e.g., the TXOP frame 906). The first frequency band may be a UL frequency band (e.g., the UL frequency band 909) or a DL frequency band (e.g., the DL frequency band 908) of a FDD network (e.g., the network 200) shared by a plurality of networking operating entities. For example, the wireless communication device is associated with a first network operating entity of the plurality of network operating entities, which may be assigned with a first channel sensing time slot (e.g., the first channel sensing time slot 902) in the frame. The monitoring may include detecting for a reservation signal from another network operating entity in one or more channel sensing time slots before the first channel sensing time slot in the frame. For example, the reservation signal may include a RTS signal (e.g., the RTS signals 912) transmitted by a BS of the another network operating entity and/or a CTS signal (e.g., the CTS signals 914) transmitted by a UE of the another network operating entity. The another network operating entity may have a higher communication priority than the first network operating entity. In some embodiment, the first network operating entity and the another network operating entity may be associated with the same network operator, but with different power classes.

At step 1220, the method 1200 includes determining that there is no reservation for the frame from another network operating entity based on the monitoring. At step 1230, the method 1200 includes transmitting, in the first frequency band, a reservation signal in the first channel sensing time slot to reserve for a transmission time slot (e.g., the transmission time slot 904) in the frame. The reservation signal may include a pre-determined preamble known to the network operating entities. In addition, the reservation signal may include scheduling information.

At step 1240, the method 1200 includes transmitting, in the first frequency band, UL data (e.g., the DL data 918 in a DL portion (e.g., the DL portion 936) of the transmission time slot.

At step 1250, the method 1200 includes receiving, in the first frequency band, UL data (e.g., the UL data 920) in a UL portion (e.g., the UL portion 938) of the transmission time slot.

Figure 13:
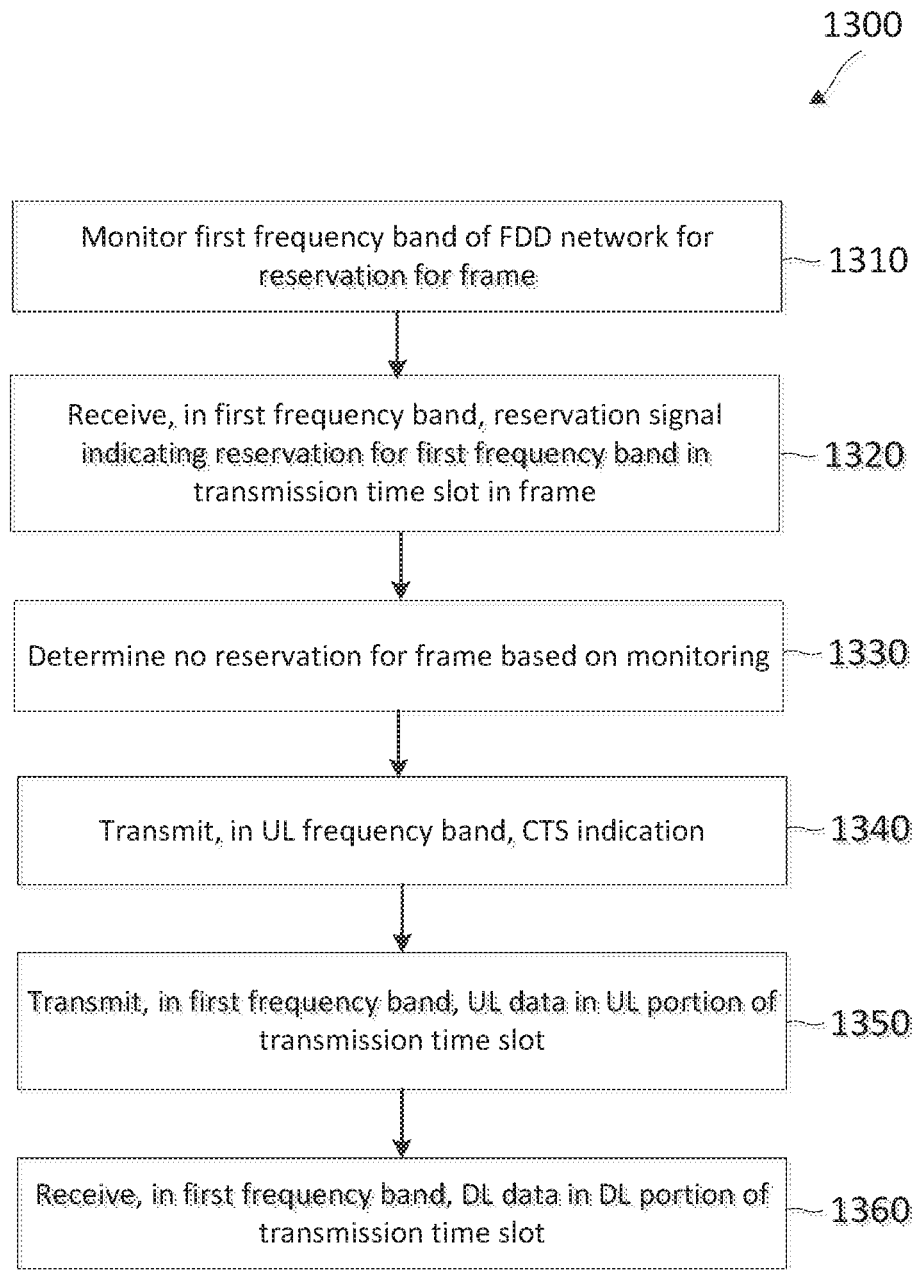
FIG. 13 is a flow diagram of a method of performing SS in a shared FDD spectrum according to embodiments of the present disclosure.

FIG. 13 is a flow diagram of a method 1300 of performing SS in a shared FDD spectrum according to embodiments of the present disclosure. Steps of the method 1300 can be executed by a computing device (e.g., a processor, processing circuit, and/or other suitable component) of a wireless communication device, such as the UEs 115, 215, and 300. The method 1300 may employ similar mechanisms as in the scheme 900 described with respect to FIG. 9, respectively. As illustrated, the method 1100 includes a number of enumerated steps, but embodiments of the method 1300 may include additional steps before, after, and in between the enumerated steps. In some embodiments, one or more of the enumerated steps may be omitted or performed in a different order.

At step 1310, the method 1300 includes monitoring a first frequency band for a reservation for a frame (e.g., the TXOP frame 906). The first frequency band may be a UL frequency band (e.g., the UL frequency band 909) or a DL frequency band (e.g., the DL frequency band 908) of a FDD network (e.g., the network 200) shared by a plurality of networking operating entities. For example, the wireless communication device is associated with a first network operating entity of the plurality of network operating entities, which may be assigned with a first channel sensing time slot (e.g., the first channel sensing time slot 902) in the frame. The monitoring may include detecting for a reservation signal from another network operating entity in one or more channel sensing time slots before the first channel sensing time slot in the frame. For example, the reservation signal may include a RTS signal (e.g., the RTS signals 912) transmitted by a BS of the another network operating entity and/or a CTS signal (e.g., the CTS signals 914) transmitted by a UE of the another network operating entity. The another network operating entity may have a higher communication priority than the first network operating entity. In some embodiment, the first network operating entity and the another network operating entity may be associated with the same network operator, but with different power classes.

At step 1320, the method 1300 includes receiving, in the first frequency band, a reservation signal in the first channel sensing time slot. The reservation signal indicates a reservation for a transmission time slot (e.g., the transmission time slot 904) in the frame. The reservation signal may include a pre-determined preamble known to the network operating entities. In addition, the reservation signal may include scheduling information.

At step 1330, the method 1300 includes determining that there is no reservation for the frame from another network operating entity based on the monitoring. At step 1340, the method 1300 includes transmitting, in the first frequency band, a CTS indication in the first channel sensing time slot in response to the reservation signal.

At step 1350, the method 1300 includes transmitting, in the first frequency band, UL data (e.g., the UL data 920 and 930) in a UL portion (e.g., the UL portion 938) of the transmission time slot.

At step 1360, the method 1300 includes receiving, in the first frequency band, UL data (e.g., the DL data 918 and 928) in a DL portion (e.g., the DL portion 936) of the transmission time slot.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a method of wireless communication, including transmitting, by a first wireless communication device in a downlink (DL) frequency band, a reservation signal in a first channel sensing time slot of a frame to reserve a transmission time slot in the frame; and receiving, by the first wireless communication device from a second wireless communication device in an uplink (UL) frequency band, an UL control signal in the first channel sensing time slot, wherein the UL frequency band and the DL frequency band are shared by a plurality of network operating entities for frequency-division duplexing (FDD) communications. Accordingly, in some instances, the first wireless communication device communicates, with a second wireless communication device in a downlink (DL) frequency band, a reservation signal in a first channel sensing time slot of a frame to reserve a transmission time slot in the frame; and communicates, in an uplink (UL) frequency band, an UL control signal in the first channel sensing time slot.

In some embodiments, the first wireless communication device, the second wireless communication device, and the first channel sensing time slot are associated with a first network operating entity of the plurality of network operating entities, and wherein the method further comprises monitoring, by the first wireless communication device in one or more second channel sensing time slots before the first channel sensing time slot in the frame, for a reservation for the frame from another network operating entity. In some embodiments, the monitoring includes monitoring at least one of the DL frequency band or the UL frequency band for the reservation. In some embodiments, the another network operating entity has a higher communication priority than the first network operating entity, wherein the first channel sensing time slot is designated for the first network operating entity, and wherein the second channel sensing time slot is designated for the another network operating entity. In some embodiments, the reservation signal includes a pre-determined preamble sequence. In some embodiments, the reservation signal includes scheduling information, and wherein the method further comprises communicating, by the first wireless communication device with one or more third wireless communication device in the transmission time slot based on at least the scheduling information transmitted in the first channel sensing slot. In some embodiments, the method further comprises transmitting, by the first wireless communication device in the DL frequency band, a DL control signal in the first channel sensing slot. In some embodiments, the method further comprises receiving, by the first wireless communication device from one or more third wireless communication devices in the UL frequency band, one or more clear-to-send (CTS) indications for one or more transmission grants for the one or more third wireless communication devices. In some embodiments, the reservation signal indicates first scheduling information including the one or more transmission grants, and wherein the method further comprises generating, by the first wireless communication device, updated scheduling information based on at least the first scheduling information and the one or more CTS indications; transmitting, by the first wireless communication device in the DL frequency band, the updated scheduling information in the transmission time slot; and communicating, by the first wireless communication device, with the one or more third wireless communication devices based on at least the updated scheduling information. In some embodiments, the method further comprises receiving, from the UL frequency band while transmitting the updated scheduling information, a UL data signal in the transmission time slot according to the first scheduling information or previous scheduling information transmitted in a previous frame.

Further embodiments of the present disclosure include a method of wireless communication, including transmitting, by a first wireless communication device in a first frequency band of a frequency-division duplexing (FDD) network shared by a plurality of network operating entities, a reservation signal in a first channel sensing time slot of a frame to reserve the first frequency band in a transmission time slot in the frame; transmitting, by the first wireless communication device to one or more second wireless communication devices in the first frequency band, downlink (DL) data in a DL portion of the transmission time slot; and receiving, by the first wireless communication device from the one or more second wireless communication devices in the first frequency band, uplink (UL) data in a UL portion of the transmission time slot. Accordingly, in some instances, the first wireless communication device communicates, in a first frequency band of a frequency-division duplexing (FDD) network shared by a plurality of network operating entities, a reservation signal in a first channel sensing time slot of a frame to reserve the first frequency band in a transmission time slot in the frame; communicates, with a second wireless communication device in the first frequency band, downlink (DL) data in a DL portion of the transmission time slot; and communicates, with the second wireless communication device in the first frequency band, uplink (UL) data in a UL portion of the transmission time slot.

In some embodiments, the first wireless communication device, the one or more second wireless communication devices, and the first channel sensing time slot are associated with a first network operating entity of the plurality of network operating entities, and wherein the method further comprises monitoring, by the first wireless communication device in one or more second channel sensing time slots before the first channel sensing time slot in the frame, for a reservation for the first frequency band in the frame from another network operating entity of the plurality of network operating entities. In some embodiments, the another network operating entity and the first network operating entity are associated with different power classes. In some embodiments, the first frequency band is an uplink (UL) frequency band of the FDD network. In some embodiments, the first frequency band is a downlink (DL) frequency band of the FDD network.

Further embodiments of the present disclosure include a method of wireless communication, including receiving, by a first wireless communication device from a second wireless communication device in a downlink (DL) frequency band, a reservation signal in a first channel sensing time slot of a frame indicating a reservation for a transmission time slot in the frame; and transmitting, by the first wireless communication device to the second wireless communication device in a uplink (UL) frequency band, a UL control signal in the first channel sensing time slot while receiving the reservation signal, wherein the UL frequency band and the DL frequency band are shared by a plurality of network operating entities for frequency-division duplexing (FDD) communications. Accordingly, in some instances, the first wireless communication device communicates, with a second wireless communication device in a downlink (DL) frequency band, a reservation signal in a first channel sensing time slot of a frame to reserve a transmission time slot in the frame; and communicates, in an uplink (UL) frequency band, an UL control signal in the first channel sensing time slot.

In some embodiments, the first wireless communication device, the second wireless communication device, and the first channel sensing time slot are associated with a first network operating entity of the plurality of network operating entities, and wherein the method further comprises monitoring, by the first wireless communication device in one or more second channel sensing time slots before the first channel sensing time slot in the frame, for a reservation for the frame from another network operating entity. In some embodiments, the monitoring includes monitoring at least one of the DL frequency band or the UL frequency band for the reservation. In some embodiments, the another network operating entity has a higher communication priority than the first network operating entity, wherein the first channel sensing time slot is designated for the first network operating entity, and wherein the second channel sensing time slot is designated for the another network operating entity. In some embodiments, the method further comprises transmitting, by the first wireless communication device to the second wireless communication device in the UL frequency band, a clear to send (CTS) indication in the first channel sensing time slot. In some embodiments, the reservation signal includes a pre-determined preamble sequence. In some embodiments, the reservation signal includes scheduling information for the first wireless communication device, and wherein the method further comprises communicating, by the first wireless communication device, with the second wireless communication device in the transmission time slot based on at least the scheduling information received in the first channel sensing slot. In some embodiments, the method further comprises receiving, by the first wireless communication device from the second wireless communication device in the DL frequency band, updated scheduling information in the transmission time slot; and communicating, by the first wireless communication device, with the second wireless communication device in the transmission time slot based on at least the updated scheduling information. In some embodiments, the communicating includes transmitting, to the second wireless communication device in the UL frequency band while receiving the updated scheduling information, an UL data signal in the transmission time slot according to previous scheduling information.

Further embodiments of the present disclosure include a method of wireless communication, including receiving, by a first wireless communication device from a second wireless communication device in a first frequency band of a frequency-division duplexing (FDD) network shared by a plurality of network operating entities, a reservation signal in a first channel sensing time slot of a frame to reserve the first frequency band in a transmission time slot in the frame; transmitting, by the first wireless communication device to the second wireless communication devices in the first frequency band, uplink (UL) data in a UL portion of the transmission time slot; and receiving, by the first wireless communication device from the second wireless communication device in the first frequency band, downlink (DL) data in a DL portion of the transmission time slot. Accordingly, in some instances, the first wireless communication device communicates, in a first frequency band of a frequency-division duplexing (FDD) network shared by a plurality of network operating entities, a reservation signal in a first channel sensing time slot of a frame to reserve the first frequency band in a transmission time slot in the frame; communicates, with a second wireless communication device in the first frequency band, downlink (DL) data in a DL portion of the transmission time slot; and communicates, with the second wireless communication device in the first frequency band, uplink (UL) data in a UL portion of the transmission time slot.

In some embodiments, the first wireless communication device and the second wireless communication devices, and the first channel sensing time slot are associated with a first network operating entity of the plurality of network operating entities, and wherein the method further comprises monitoring, by the first wireless communication device in one or more second channel sensing time slots before the first channel sensing time slot in the frame, for a reservation for the frame in the first frequency band from another network operating entity of the plurality of network operating entities. In some embodiments, the another network operating entity and the first network operating entity are associated with different power classes. In some embodiments, the first frequency band is an uplink (UL) frequency band of the FDD network. In some embodiments, the first frequency band is a downlink (DL) frequency band of the FDD network.

Further embodiments of the present disclosure include an apparatus comprising a transmitter configured to transmit, in a downlink (DL) frequency band, a reservation signal in a first channel sensing time slot of a frame to reserve a transmission time slot in the frame; and a receiver configured to receive, from a first wireless communication device in an uplink (UL) frequency band, an UL control signal in the first channel sensing time slot, wherein the UL frequency band and the DL frequency band are shared by a plurality of network operating entities for frequency-division duplexing (FDD) communications.

In some embodiments, the apparatus, the first wireless communication device, and the first channel sensing time slot are associated with a first network operating entity of the plurality of network operating entities, and wherein the apparatus further comprises a processor configured to monitor, in one or more first channel sensing time slots before the first channel sensing time slot in the frame, for a reservation for the frame from another network operating entity. In some embodiments, the processor is further to monitor for the reservation by monitoring at least one of the DL frequency band or the UL frequency band for the reservation. In some embodiments, the another network operating entity has a higher communication priority than the first network operating entity, wherein the first channel sensing time slot is designated for the first network operating entity, and wherein the second channel sensing time slot is designated for the another network operating entity. In some embodiments, the reservation signal includes a pre-determined preamble sequence. In some embodiments, the reservation signal includes scheduling information, and wherein the apparatus further comprises a processor configured to communicate, with one or more third wireless communication device in the transmission time slot based on at least the scheduling information transmitted in the first channel sensing slot. In some embodiments, the transmitter is further configured to transmit, in the DL frequency band, a DL control signal in the first channel sensing slot. In some embodiments, the receiver is further configured to receive, from one or more third wireless communication devices in the UL frequency band, one or more clear-to-send (CTS) indications for one or more transmission grants for the one or more third wireless communication devices. In some embodiments, the reservation signal indicates first scheduling information including the one or more transmission grants, wherein the apparatus further comprises a processor configured to generate updated scheduling information based on at least the first scheduling information and the one or more CTS indications; and communicate with the one or more third wireless communication devices based on at least the updated scheduling information, and wherein the transmitter is further configured to transmit, in the DL frequency band, the updated scheduling information in the transmission time slot. In some embodiments, the receiver is further configured to receive, from the UL frequency band while transmitting the updated scheduling information, a UL data signal in the transmission time slot according to the first scheduling information or previous scheduling information transmitted in a previous frame.

Further embodiments of the present disclosure include an apparatus including a transmitter configured to transmit, in a first frequency band of a frequency-division duplexing (FDD) network shared by a plurality of network operating entities, a reservation signal in a first channel sensing time slot of a frame to reserve the first frequency band in a transmission time slot in the frame; and transmit, to one or more first wireless communication devices in the first frequency band, downlink (DL) data in a DL portion of the transmission time slot; and a receiver configured to receive, from the one or more first wireless communication devices in the first frequency band, uplink (UL) data in a UL portion of the transmission time slot.

In some embodiments, the apparatus, the one or more first wireless communication devices, and the first channel sensing time slot are associated with a first network operating entity of the plurality of network operating entities, and wherein the apparatus further comprises a processor configured to monitor, in one or more second channel sensing time slots before the first channel sensing time slot in the frame, for a reservation for the first frequency band in the frame from another network operating entity of the plurality of network operating entities. In some embodiments, the another network operating entity and the first network operating entity are associated with different power classes. In some embodiments, the first frequency band is an uplink (UL) frequency band of the FDD network. In some embodiments, the first frequency band is a downlink (DL) frequency band of the FDD network.

Further embodiments of the present disclosure include an apparatus including a receiver configured to receive, from a first wireless communication device in a downlink (DL) frequency band, a reservation signal in a first channel sensing time slot of a frame indicating a reservation for a transmission time slot in the frame; and a transmitter configured to transmit, to the first wireless communication device in a uplink (UL) frequency band, a UL control signal in the first channel sensing time slot while receiving the reservation signal, wherein the UL frequency band and the DL frequency band are shared by a plurality of network operating entities for frequency-division duplexing (FDD) communications.

In some embodiments, the first wireless communication device, the first wireless communication device, and the first channel sensing time slot are associated with a first network operating entity of the plurality of network operating entities, and wherein the apparatus further comprises a processor configured to monitor, in one or more second channel sensing time slots before the first channel sensing time slot in the frame, for a reservation for the frame from another network operating entity. In some embodiments, the processor is further to monitor for the reservation by monitoring at least one of the DL frequency band or the UL frequency band for the reservation. In some embodiments, the another network operating entity has a higher communication priority than the first network operating entity, wherein the first channel sensing time slot is designated for the first network operating entity, and wherein the second channel sensing time slot is designated for the another network operating entity. In some embodiments, the transmitter is further configured to transmit, to the first wireless communication device in the UL frequency band, a clear to send (CTS) indication in the first channel sensing time slot. In some embodiments, the reservation signal includes a pre-determined preamble sequence. In some embodiments, the reservation signal includes scheduling information for the first wireless communication device, and wherein the apparatus further comprises a processor configured to communicate with the first wireless communication device in the transmission time slot based on at least the scheduling information received in the first channel sensing slot. In some embodiments, the receiver is further configured to receive, from the first wireless communication device in the DL frequency band, updated scheduling information in the transmission time slot, and wherein the apparatus further comprises a processor configured to communicate with the first wireless communication device in the transmission time slot based on at least the updated scheduling information. In some embodiments, the processor is further configured to communicate by transmitting, via the transmitter, in the UL frequency band while receiving the updated scheduling information, an UL data signal in the transmission time slot according to previous scheduling information.

Further embodiments of the present disclosure include an apparatus including a receiver configured to receive, from a first wireless communication device in a first frequency band of a frequency-division duplexing (FDD) network shared by a plurality of network operating entities, a reservation signal in a first channel sensing time slot of a frame to reserve the first frequency band in a transmission time slot in the frame; and receive, from the first wireless communication device in the first frequency band, downlink (DL) data in a DL portion of the transmission time slot; and a transmitter configured to transmit, to the first wireless communication devices in the first frequency band, uplink (UL) data in a UL portion of the transmission time slot.

In some embodiments, the apparatus and the first wireless communication devices, and the first channel sensing time slot are associated with a first network operating entity of the plurality of network operating entities, and wherein the apparatus further comprises a processor configured to monitor, in one or more second channel sensing time slots before the first channel sensing time slot in the frame, for a reservation for the frame in the first frequency band from another network operating entity of the plurality of network operating entities. In some embodiments, the another network operating entity and the first network operating entity are associated with different power classes. In some embodiments, the first frequency band is an uplink (UL) frequency band of the FDD network. In some embodiments, the first frequency band is a downlink (DL) frequency band of the FDD network.

Further embodiments of the present disclosure include a computer-readable medium having program code recorded thereon, the program code including code for causing a first wireless communication device to transmit, in a downlink (DL) frequency band, a reservation signal in a first channel sensing time slot of a frame to reserve a transmission time slot in the frame; and code for causing a first wireless communication device to receive, from a second wireless communication device in an uplink (UL) frequency band, an UL control signal in the first channel sensing time slot, wherein the UL frequency band and the DL frequency band are shared by a plurality of network operating entities for frequency-division duplexing (FDD) communications.

In some embodiments, the first wireless communication device, the second wireless communication device, and the first channel sensing time slot are associated with a first network operating entity of the plurality of network operating entities, and wherein the code for monitoring is further configured to monitor, in one or more second channel sensing time slots before the first channel sensing time slot in the frame, for a reservation for the frame from another network operating entity. In some embodiments, the processor is further configured to monitor for the reservation by monitoring at least one of the DL frequency band or the UL frequency band for the reservation. In some embodiments, the another network operating entity has a higher communication priority than the first network operating entity, wherein the first channel sensing time slot is designated for the first network operating entity, and wherein the second channel sensing time slot is designated for the another network operating entity. In some embodiments, the reservation signal includes a pre-determined preamble sequence. In some embodiments, the reservation signal includes scheduling information, and wherein computer-readable medium further comprises code for causing a first wireless communication device to communicate with one or more third wireless communication device in the transmission time slot based on at least the scheduling information transmitted in the first channel sensing slot. In some embodiments, the computer-readable medium further comprises transmitting, by the first wireless communication device in the DL frequency band, a DL control signal in the first channel sensing slot. In some embodiments, the computer-readable medium further comprises code for causing a first wireless communication device to receive, from one or more third wireless communication devices in the UL frequency band, one or more clear-to-send (CTS) indications for one or more transmission grants for the one or more third wireless communication devices. In some embodiments, the reservation signal indicates first scheduling information including the one or more transmission grants, and wherein the computer-readable medium further comprises code for causing a first wireless communication device to generate updated scheduling information based on at least the first scheduling information and the one or more CTS indications; code for causing a first wireless communication device to transmit, in the DL frequency band, the updated scheduling information in the transmission time slot; and code for causing a first wireless communication device to communicate with the one or more third wireless communication devices based on at least the updated scheduling information. In some embodiments, the computer-readable medium further comprises code for causing a first wireless communication device to receive, from the UL frequency band while transmitting the updated scheduling information, a UL data signal in the transmission time slot according to the first scheduling information or previous scheduling information transmitted in a previous frame.

Further embodiments of the present disclosure include a computer-readable medium having program code recorded thereon, the program code including code for causing a first wireless communication device to transmit, in a first frequency band of a frequency-division duplexing (FDD) network shared by a plurality of network operating entities, a reservation signal in a first channel sensing time slot of a frame to reserve the first frequency band in a transmission time slot in the frame; code for causing a first wireless communication device to transmit, to one or more second wireless communication devices in the first frequency band, downlink (DL) data in a DL portion of the transmission time slot; and code for causing a first wireless communication device to receive, from the one or more second wireless communication devices in the first frequency band, uplink (UL) data in a UL portion of the transmission time slot.

In some embodiments, the first wireless communication device, the one or more second wireless communication devices, and the first channel sensing time slot are associated with a first network operating entity of the plurality of network operating entities, and wherein the computer-readable medium further comprises code for causing a first wireless communication device to monitor, in one or more second channel sensing time slots before the first channel sensing time slot in the frame, for a reservation for the first frequency band in the frame from another network operating entity of the plurality of network operating entities. In some embodiments, the another network operating entity and the first network operating entity are associated with different power classes. In some embodiments, the first frequency band is an uplink (UL) frequency band of the FDD network. In some embodiments, the first frequency band is a downlink (DL) frequency band of the FDD network.

Further embodiments of the present disclosure include a computer-readable medium having program code recorded thereon, the program code comprising code for causing a first wireless communication device to receive, from a second wireless communication device in a downlink (DL) frequency band, a reservation signal in a first channel sensing time slot of a frame indicating a reservation for a transmission time slot in the frame; and code for causing a first wireless communication device to transmit, to the second wireless communication device in a uplink (UL) frequency band, a UL control signal in the first channel sensing time slot while receiving the reservation signal, wherein the UL frequency band and the DL frequency band are shared by a plurality of network operating entities for frequency-division duplexing (FDD) communications.

In some embodiments, the first wireless communication device, the second wireless communication device, and the first channel sensing time slot are associated with a first network operating entity of the plurality of network operating entities, and wherein the computer-readable medium further comprises code for causing a first wireless communication device to monitor, in one or more second channel sensing time slots before the first channel sensing time slot in the frame, for a reservation for the frame from another network operating entity. In some embodiments, the monitoring includes monitoring at least one of the DL frequency band or the UL frequency band for the reservation. In some embodiments, the another network operating entity has a higher communication priority than the first network operating entity, wherein the first channel sensing time slot is designated for the first network operating entity, and wherein the second channel sensing time slot is designated for the another network operating entity. In some embodiments, the computer-readable medium further comprises code for causing a first wireless communication device to transmit, to the second wireless communication device in the UL frequency band, a clear to send (CTS) indication in the first channel sensing time slot. In some embodiments, the reservation signal includes a pre-determined preamble sequence. In some embodiments, the reservation signal includes scheduling information for the first wireless communication device, and wherein the computer-readable medium further comprises code for causing a first wireless communication device to communicate with the second wireless communication device in the transmission time slot based on at least the scheduling information received in the first channel sensing slot. In some embodiments, the computer-readable medium further comprises code for causing a first wireless communication device to receive, from the second wireless communication device in the DL frequency band, updated scheduling information in the transmission time slot; and code for causing a first wireless communication device to communicate with the second wireless communication device in the transmission time slot based on at least the updated scheduling information. In some embodiments, the code for communicating is further configured to transmit, to the second wireless communication device in the UL frequency band while receiving the updated scheduling information, an UL data signal in the transmission time slot according to previous scheduling information.

Further embodiments of the present disclosure include a computer-readable medium having program code recorded thereon, the program code including code for causing a first wireless communication device to receive, from a second wireless communication device in a first frequency band of a frequency-division duplexing (FDD) network shared by a plurality of network operating entities, a reservation signal in a first channel sensing time slot of a frame to reserve the first frequency band in a transmission time slot in the frame; code for causing a first wireless communication device to transmit, to the second wireless communication devices in the first frequency band, uplink (UL) data in a UL portion of the transmission time slot; and code for causing a first wireless communication device to receive, from the second wireless communication device in the first frequency band, downlink (DL) data in a DL portion of the transmission time slot.

In some embodiments, the first wireless communication device and the second wireless communication devices, and the first channel sensing time slot are associated with a first network operating entity of the plurality of network operating entities, and wherein the computer-readable medium further comprises code for causing a first wireless communication device to monitor, in one or more second channel sensing time slots before the first channel sensing time slot in the frame, for a reservation for the frame in the first frequency band from another network operating entity of the plurality of network operating entities. In some embodiments, the another network operating entity and the first network operating entity are associated with different power classes. In some embodiments, the first frequency band is an uplink (UL) frequency band of the FDD network. In some embodiments, the first frequency band is a downlink (DL) frequency band of the FDD network.

Further embodiments of the present disclosure include an apparatus including means for transmitting, in a downlink (DL) frequency band, a reservation signal in a first channel sensing time slot of a frame to reserve a transmission time slot in the frame; and means for receiving, from a first wireless communication device in an uplink (UL) frequency band, an UL control signal in the first channel sensing time slot, wherein the UL frequency band and the DL frequency band are shared by a plurality of network operating entities for frequency-division duplexing (FDD) communications.

In some embodiments, the apparatus, the first wireless communication device, and the first channel sensing time slot are associated with a first network operating entity of the plurality of network operating entities, and wherein the apparatus further comprises means for monitoring, in one or more first channel sensing time slots before the first channel sensing time slot in the frame, for a reservation for the frame from another network operating entity. In some embodiments the means for monitoring is further configured monitor at least one of the DL frequency band or the UL frequency band for the reservation. In some embodiments, the another network operating entity has a higher communication priority than the first network operating entity, wherein the first channel sensing time slot is designated for the first network operating entity, and wherein the second channel sensing time slot is designated for the another network operating entity. In some embodiments, the reservation signal includes a pre-determined preamble sequence.

In some embodiments, the reservation signal includes scheduling information, and wherein the apparatus further comprises means for communicating, with one or more third wireless communication device in the transmission time slot based on at least the scheduling information transmitted in the first channel sensing slot. In some embodiments, the apparatus further comprises means for transmitting, in the DL frequency band, a DL control signal in the first channel sensing slot. In some embodiments, the receiver is further configured to receive, from one or more third wireless communication devices in the UL frequency band, one or more clear-to-send (CTS) indications for one or more transmission grants for the one or more third wireless communication devices. In some embodiments, the reservation signal indicates first scheduling information including the one or more transmission grants, and wherein the apparatus further comprises means for generating updated scheduling information based on at least the first scheduling information and the one or more CTS indications; and means for communicating with the one or more third wireless communication devices based on at least the updated scheduling information, and wherein the transmitter is further configured to transmit, in the DL frequency band, the updated scheduling information in the transmission time slot. In some embodiments, the apparatus further comprises means for receiving, from the UL frequency band while transmitting the updated scheduling information, a UL data signal in the transmission time slot according to the first scheduling information or previous scheduling information transmitted in a previous frame.

Further embodiments of the present disclosure include an apparatus including means for transmitting, in a first frequency band of a frequency-division duplexing (FDD) network shared by a plurality of network operating entities, a reservation signal in a first channel sensing time slot of a frame to reserve the first frequency band in a transmission time slot in the frame; means for transmitting, to one or more first wireless communication devices in the first frequency band, downlink (DL) data in a DL portion of the transmission time slot; and means for receiving, from the one or more first wireless communication devices in the first frequency band, uplink (UL) data in a UL portion of the transmission time slot.

In some embodiments, the apparatus, the one or more first wireless communication devices, and the first channel sensing time slot are associated with a first network operating entity of the plurality of network operating entities, and wherein the apparatus further comprises means for monitoring, in one or more second channel sensing time slots before the first channel sensing time slot in the frame, for a reservation for the first frequency band in the frame from another network operating entity of the plurality of network operating entities. In some embodiments, the another network operating entity and the first network operating entity are associated with different power classes. In some embodiments, the first frequency band is an uplink (UL) frequency band of the FDD network. In some embodiments, the first frequency band is a downlink (DL) frequency band of the FDD network.

Further embodiments of the present disclosure include an apparatus including means for receiving, from a first wireless communication device in a downlink (DL) frequency band, a reservation signal in a first channel sensing time slot of a frame indicating a reservation for a transmission time slot in the frame; and means for transmitting, to the first wireless communication device in a uplink (UL) frequency band, a UL control signal in the first channel sensing time slot while receiving the reservation signal, wherein the UL frequency band and the DL frequency band are shared by a plurality of network operating entities for frequency-division duplexing (FDD) communications.

In some embodiments, the apparatus, the first wireless communication device, and the first channel sensing time slot are associated with a first network operating entity of the plurality of network operating entities, and wherein the apparatus further comprises means for monitoring, in one or more second channel sensing time slots before the first channel sensing time slot in the frame, for a reservation for the frame from another network operating entity. In some embodiments, the means for monitoring are further configured to monitoring at least one of the DL frequency band or the UL frequency band for the reservation. In some embodiments, the another network operating entity has a higher communication priority than the first network operating entity, wherein the first channel sensing time slot is designated for the first network operating entity, and wherein the second channel sensing time slot is designated for the another network operating entity. In some embodiments, the apparatus further comprises means for transmitting, to the first wireless communication device in the UL frequency band, a clear to send (CTS) indication in the first channel sensing time slot. In some embodiments, the reservation signal includes a pre-determined preamble sequence. In some embodiments, the reservation signal includes scheduling information for the apparatus, and wherein the apparatus further comprises means for communicating with the first wireless communication device in the transmission time slot based on at least the scheduling information received in the first channel sensing slot. In some embodiments, the apparatus further comprises means for receiving, from the first wireless communication device in the DL frequency band, updated scheduling information in the transmission time slot; and means for communicating with the first wireless communication device in the transmission time slot based on at least the updated scheduling information. In some embodiments, the means for communicating are further configured to transmit, in the UL frequency band while receiving the updated scheduling information, an UL data signal in the transmission time slot according to previous scheduling information.

Further embodiments of the present disclosure include an apparatus of wireless communication, including means for receiving, from a first wireless communication device in a first frequency band of a frequency-division duplexing (FDD) network shared by a plurality of network operating entities, a reservation signal in a first channel sensing time slot of a frame to reserve the first frequency band in a transmission time slot in the frame; means for receiving, from the first wireless communication device in the first frequency band, downlink (DL) data in a DL portion of the transmission time slot; and means for transmitting, to the first wireless communication devices in the first frequency band, uplink (UL) data in a UL portion of the transmission time slot.

In some embodiments, the apparatus and the first wireless communication devices, and the first channel sensing time slot are associated with a first network operating entity of the plurality of network operating entities, and wherein the apparatus further comprises means for monitoring, in one or more second channel sensing time slots before the first channel sensing time slot in the frame, for a reservation for the frame in the first frequency band from another network operating entity of the plurality of network operating entities. In some embodiments, the another network operating entity and the first network operating entity are associated with different power classes. In some embodiments, the first frequency band is an uplink (UL) frequency band of the FDD network. In some embodiments, the first frequency band is a downlink (DL) frequency band of the FDD network.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
    communicating, by a first wireless communication device with a second wireless communication device, a reservation signal in a downlink (DL) frequency band during a first channel sensing time slot of a frame to reserve the DL frequency band for communicating a DL communication signal in a transmission time slot of the frame and to reserve an uplink (UL) frequency band for communicating a UL communication signal in the transmission time slot concurrent with the DL communication signal, wherein the DL frequency band and the UL frequency band are shared by a plurality of network operating entities for frequency-division duplexing (FDD) communications, and wherein the first wireless communication device and the second wireless communication device are associated with a first network operating entity of the plurality of network operating entities;
    communicating, by the first wireless communication device in the UL frequency band, an UL control signal in the first channel sensing time slot;
    communicating, by the first wireless communication device with the second wireless communication device, the DL communication signal in the DL frequency band concurrent with the UL communication signal in the UL frequency band during the transmission time slot in response to the reservation signal; and
    refraining, by the first wireless communication device, from communicating in the UL frequency band and the DL frequency band during another frame based on a reservation from another network operating entity.

2. The method of claim 1, wherein the first channel sensing time slot is associated with the first network operating entity, and wherein the method further comprises monitoring, by the first wireless communication device in a second channel sensing time slot before the first channel sensing time slot in the frame, for a reservation for the frame from the another network operating entity.

3. The method of claim 2, wherein the monitoring includes monitoring at least one of the DL frequency band or the UL frequency band for the reservation.

4. The method of claim 2, wherein the another network operating entity has priority over the first network operating entity in the frame, wherein the first channel sensing time slot is designated for the first network operating entity, and wherein the second channel sensing time slot is designated for the another network operating entity.

5. The method of claim 1, wherein the reservation signal includes scheduling information, and wherein the method further comprises communicating, by the first wireless communication device with the second wireless communication device in the transmission time slot, a communication signal based on at least the scheduling information transmitted in the first channel sensing time slot.

6. The method of claim 1, further comprising communicating, by the first wireless communication device in the DL frequency band, a DL control signal in the first channel sensing time slot.

7. The method of claim 1, wherein the reservation signal indicates first scheduling information, and wherein the method further comprises:
    communicating, by the first wireless communication device in the DL frequency band during the transmission time slot, updated scheduling information; and
    communicating, by the first wireless communication device during the transmission time slot, a communication signal based on at least the updated scheduling information.

8. The method of claim 7, further comprising communicating, by the first wireless communication device in the UL frequency band while communicating the updated scheduling information in the DL frequency band, a UL data signal in the transmission time slot according to the first scheduling information or previous scheduling information transmitted in a previous frame.

9. The method of claim 7, wherein the first scheduling information includes one or more transmission grants for one or more third wireless communication devices, and wherein the method further comprises:
    receiving, by the first wireless communication device from the one or more third wireless communication devices in the UL frequency band, one or more clear-to-send (CTS) indications for the one or more transmission grants; and
    generating, by the first wireless communication device, the updated scheduling information based on at least the one or more CTS indications.

10. The method of claim 7, further comprising transmitting, by the first wireless communication device in the UL frequency band in response to the first scheduling information, a clear-to-send (CTS) indication, wherein the communicating the updated scheduling information includes receiving, from the second wireless communication device, the updated scheduling information based on the CTS indication.

11. A method of wireless communication, comprising:
    identifying, by a first wireless communication device, a frame in a first frequency band of a frequency-division duplexing (FDD) network shared by a plurality of network operating entities, the frame including a plurality of channel sensing time slots, wherein each channel sensing time slot of the plurality of channel sensing time slots is assigned to a different network operating entity power class, and wherein the first wireless communication device is associated with a first network operating entity of the plurality of network operating entities;
    identifying, by the first wireless communication device, a first channel sensing time slot from the plurality of channel sensing time slots based on the first network operating entity associated with a first network operating entity power class;
    communicating, by the first wireless communication device with a second wireless communication device in the first frequency band, a reservation signal in the first channel sensing time slot to reserve the first frequency band in a transmission time slot in the frame;

communicating, by the first wireless communication device with the second wireless communication device in the first frequency band, downlink (DL) data in a DL portion of the transmission time slot;

communicating, by the first wireless communication device with the second wireless communication device in the first frequency band, uplink (UL) data in a UL portion of the transmission time slot; and refraining, by the first wireless communication device, from communicating in the first frequency band during another frame based on a reservation from another network operating entity, the another network operating entity associated with a second network operating entity power class.

12. The method of claim 11, wherein the first channel sensing time slot is associated with the first network operating entity, and wherein the method further comprises monitoring, by the first wireless communication device in a second channel sensing time slot of the plurality of channel sensing time slots, the second channel sensing time slot being before the first channel sensing time slot in the frame, for a reservation for the first frequency band in the frame from the another network operating entity.

13. The method of claim 12, wherein the first channel sensing time slot is associated with the first network operating entity power class, and wherein the second channel sensing time slot is associated with the second network operating power class, and wherein the first network operating entity power class is different from the second network operating entity power class.

14. The method of claim 11, wherein the first frequency band is an uplink (UL) frequency band of the FDD network.

15. The method of claim 11, wherein the first frequency band is a downlink (DL) frequency band of the FDD network.

16. An apparatus comprising:
a transceiver configured to:
communicate, with a second wireless communication device, a reservation signal in a downlink (DL) frequency band during a first channel sensing time slot of a frame to reserve the DL frequency band for communicating a DL communication signal in a transmission time slot of the frame and to reserve an uplink (UL) frequency band for communicating a UL communication signal in the transmission time slot concurrent with the DL communication signal, wherein the DL frequency band and the UL frequency band are shared by a plurality of network operating entities for frequency-division duplexing (FDD) communications, and wherein the apparatus and the second wireless communication device are associated with a first network operating entity of the plurality of network operating entities;

communicate, in the uplink (UL) frequency band, an UL control signal in the first channel sensing time slot;

communicate, with the second wireless communication device, the DL communication signal in the DL frequency band concurrent with the UL communication signal in the UL frequency band during the transmission time slot in response to the reservation signal; and refrain from communicating in the UL frequency band and the DL frequency band during another frame based on a reservation from another network operating entity.

17. The apparatus of claim 16, wherein the first channel sensing time slot is associated with the first network operating entity, and wherein the apparatus further comprises a processor configured to monitor, in a second channel sensing time slot before the first channel sensing time slot in the frame, for a reservation for the frame from the another network operating entity.

18. The apparatus of claim 17, wherein the processor is further configured to monitor the reservation for the frame from the another network operating entity by monitoring at least one of the DL frequency band or the UL frequency band for the reservation.

19. The apparatus of claim 17, wherein the another network operating entity has priority over the first network operating entity in the frame, wherein the first channel sensing time slot is designated for the first network operating entity, and wherein the second channel sensing time slot is designated for the another network operating entity.

20. The apparatus of claim 16, wherein the reservation signal includes scheduling information, and wherein the transceiver is further configured to communicate, with the second wireless communication device in the transmission time slot, a communication signal based on at least the scheduling information transmitted in the first channel sensing time slot.

21. The apparatus of claim 16, wherein the transceiver is further configured to communicate, in the DL frequency band, a DL control signal in the first channel sensing time slot.

22. The apparatus of claim 16, wherein the reservation signal indicates first scheduling information, and wherein the transceiver is further configured to:
communicate, in the DL frequency band during the transmission time slot, updated scheduling information; and
communicate, during the transmission time slot, a communication signal based on at least the updated scheduling information.

23. The apparatus of claim 22, wherein the transceiver is further configured to communicate, in the UL frequency band while communicating the updated scheduling information in the DL frequency band, a UL data signal in the transmission time slot according to the first scheduling information or previous scheduling information transmitted in a previous frame.

24. The apparatus of claim 22, wherein the first scheduling information includes one or more transmission grants for one or more third wireless communication devices, wherein the transceiver is further configured to receive, from the one or more third wireless communication devices in the UL frequency band, one or more clear-to-send (CTS) indications for the one or more transmission grants, and wherein the apparatus further comprises a processor configured to generate the updated scheduling information based on at least the one or more CTS indications.

25. The apparatus of claim 22, wherein the transceiver is further configured to:
transmit, in the UL frequency band in response to the first scheduling information, a clear-to-send (CTS) indication; and
communicate the updated scheduling information by receiving, from the second wireless communication device, the updated scheduling information based on the CTS indication.

26. An apparatus comprising:
a processor configured to:
- identify a frame in a first frequency band of a frequency-division duplexing (FDD) network shared by a plurality of network operating entities, the frame including a plurality of channel sensing time slots, wherein each channel sensing time slot of the plurality of channel sensing time slots is assigned to a different network operating entity power class, and wherein the apparatus is associated with a first network operating entity of the plurality of network operating entities; and
- identify a first channel sensing time slot from the plurality of channel sensing time slots based on the first network operating entity associated with a first network operating entity power class; and a transceiver configured to:
- communicate, with a second wireless communication device in the first frequency band, a reservation signal in the first channel sensing time slot to reserve the first frequency band in a transmission time slot in the frame;
- communicate, with the second wireless communication device in the first frequency band, downlink (DL) data in a DL portion of the transmission time slot;
- communicate, with the second wireless communication device in the first frequency band, uplink (UL) data in a UL portion of the transmission time slot; and
- refrain from communicating in the first frequency band during another frame based on a reservation from another network operating entity, the another network operating entity associated with a second network operating entity power class.

27. The apparatus of claim 26, wherein the first channel sensing time slot is associated with the first network operating entity of the plurality of network operating entities, and wherein the processor is further configured to monitor, in a second channel sensing time slot of the plurality of channel sensing time slots, the second channel sensing time slot being before the first channel sensing time slot in the frame, for a reservation for the first frequency band in the frame from the another network operating entity.

28. The apparatus of claim 27, wherein the first channel sensing time slot is associated with the first network operating entity power class, and wherein the second channel sensing time slot is associated with the second network operating entity power class, and wherein the first network operating entity power class is different from the second network operating entity power class.

29. The apparatus of claim 26, wherein the first frequency band is an uplink (UL) frequency band of the FDD network.

30. The apparatus of claim 26, wherein the first frequency band is a downlink (DL) frequency band of the FDD network.

* * * * *